United States Patent
Meguro

(10) Patent No.: US 12,478,437 B2
(45) Date of Patent: Nov. 25, 2025

(54) MEDICAL IMAGE PROCESSING APPARATUS, MEDICAL IMAGE PROCESSING METHOD, ENDOSCOPE SYSTEM, AND MEDICAL IMAGE PROCESSING PROGRAM

(71) Applicant: FUJIFILM Corporation, Tokyo (JP)

(72) Inventor: Misaki Meguro, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 173 days.

(21) Appl. No.: 18/158,336

(22) Filed: Jan. 23, 2023

(65) Prior Publication Data

US 2023/0157768 A1 May 25, 2023

Related U.S. Application Data

(63) Continuation of application No. PCT/JP2021/026720, filed on Jul. 16, 2021.

(30) Foreign Application Priority Data

Aug. 24, 2020 (JP) .................................. 2020-140943

(51) Int. Cl.
*A61B 34/20* (2016.01)
*A61B 1/00* (2006.01)
(Continued)

(52) U.S. Cl.
CPC .......... *A61B 34/20* (2016.02); *A61B 1/00045* (2013.01); *G06T 7/11* (2017.01);
(Continued)

(58) Field of Classification Search
CPC .......... A61B 1/00045; A61B 1/000096; A61B 34/20; A61B 2034/2065; G06T 7/11;
(Continued)

(56) References Cited

U.S. PATENT DOCUMENTS

2018/0243043 A1* 8/2018 Michihata .............. A61B 1/045
2019/0110855 A1 4/2019 Barral et al.
(Continued)

FOREIGN PATENT DOCUMENTS

| CN | 109215079 A | 1/2019 |
| CN | 110663251 A | 1/2020 |

(Continued)

OTHER PUBLICATIONS

An Office Action; "Notice of Reasons for Refusal," mailed by the Japanese Patent Office on Jun. 17, 2024, which corresponds to Japanese Patent Application No. 2022-545530 and is related to U.S. Appl. No. 18/158,336; with English language translation.
(Continued)

*Primary Examiner* — Amelie R Davis
(74) *Attorney, Agent, or Firm* — Studebaker Brackett PLLC

(57) ABSTRACT

An object of the present invention is to provide a medical image processing apparatus, an endoscope system, a medical image processing method, and a medical image processing program that are capable of displaying a region of interest with appropriate distinguishability. A medical image processing apparatus according to an aspect of the present invention is a medical image processing apparatus including a processor. The processor is configured to perform an image acquisition process of acquiring an observation image of a subject; a region-of-interest recognition process of recognizing a region of interest from the observation image; a tool information recognition process of recognizing tool information from the observation image, the tool information being information on a tool used for treatment of the subject; and a display control process of causing a display device to distinguishably display the observation image in a manner in
(Continued)

which the region of interest has distinguishability based on a recognition result of the tool information.

13 Claims, 15 Drawing Sheets

(51) Int. Cl.
*G06T 7/11* (2017.01)
*G06V 10/25* (2022.01)

(52) U.S. Cl.
CPC ........ *G06V 10/25* (2022.01); *A61B 1/000096* (2022.02); *A61B 2034/2055* (2016.02); *A61B 2034/2065* (2016.02); *G06T 2207/10068* (2013.01); *G06T 2207/30096* (2013.01); *G06V 2201/034* (2022.01)

(58) Field of Classification Search
CPC ........... G06T 2207/10068; G06T 2207/30096; G06V 10/25; G06V 2201/034
See application file for complete search history.

(56) References Cited

U.S. PATENT DOCUMENTS

| | | |
|---|---|---|
| 2020/0069160 A1 | 3/2020 | Oosake |
| 2020/0107819 A1* | 4/2020 | Takagi ................... A61B 8/463 |
| 2020/0188033 A1 | 6/2020 | Komp et al. |
| 2020/0304753 A1* | 9/2020 | Venkataraman ... A61B 1/00045 |
| 2021/0177248 A1 | 6/2021 | Usuda |

FOREIGN PATENT DOCUMENTS

| | | |
|---|---|---|
| EP | 3 603 482 A1 | 2/2020 |
| JP | 2016-064281 A | 4/2016 |
| WO | 2013/156893 A1 | 10/2013 |
| WO | 2020/036224 A1 | 2/2020 |

OTHER PUBLICATIONS

International Search Report issued in PCT/JP2021/026720; mailed Oct. 5, 2021.
International Preliminary Report On Patentability (Chapter I) and Written Opinion of the International Searching Authority issued in PCT/JP2021/026720; issued Feb. 28, 2023.
The extended European search report issued by the European Patent Office on Jan. 22, 2024, which corresponds to European Patent Application No. 21861035.0-1126 and is related to U.S. Appl. No. 18/158,336.
An Office Action; mailed by the China National Intellectual Property Administration of the People's Republic of China on Jul. 22, 2025, which corresponds to Chinese Patent Application No. 202180057349.7 and is related to U.S. Appl. No. 18/158,336.

* cited by examiner

MEDICAL IMAGE PROCESSING APPARATUS, MEDICAL IMAGE PROCESSING METHOD, ENDOSCOPE SYSTEM, AND MEDICAL IMAGE PROCESSING PROGRAM

CROSS-REFERENCE TO RELATED APPLICATIONS

The present application is a Continuation of PCT International Application No. PCT/JP2021/026720 filed on Jul. 16, 2021 claiming priority under 35 U.S.0 § 119(a) to Japanese Patent Application No. 2020-140943 filed on Aug. 24, 2020. Each of the above applications is hereby expressly incorporated by reference, in its entirety, into the present application.

BACKGROUND OF THE INVENTION

1. Field of the Invention

The present invention relates to a medical image processing apparatus, a medical image processing method, an endoscope system, and a medical image processing program.

2. Description of the Related Art

The endoscope system described in WO2020/036224A includes an image acquiring unit that acquires an image obtained by imaging a photographic subject, a recognizing unit that performs a recognition process of recognizing the photographic subject by using the image, a determining unit that determines an operation for the photographic subject, a setting unit that enables or disables the recognizing unit by using a determination result of the determining unit, and a reporting unit that reports an enabled or disabled state of the recognizing unit.

SUMMARY OF THE INVENTION

One embodiment of the present invention provides a medical image processing apparatus, a medical image processing method, an endoscope system, and a medical image processing program that are capable of displaying a region of interest with appropriate distinguishability.

A medical image processing apparatus according to a first aspect of the present invention is a medical image processing apparatus including a processor. The processor is configured to perform an image acquisition process of acquiring an observation image of a subject; a region-of-interest recognition process of recognizing a region of interest from the observation image; a tool information recognition process of recognizing tool information from the observation image, the tool information being information on a tool used for treatment of the subject; and a display control process of causing a display device to distinguishably display the observation image in a manner in which the region of interest has distinguishability based on a recognition result of the tool information.

In a medical image processing apparatus according to a second aspect, in the first aspect, the processor is configured to, in the tool information recognition process, determine which of a treatment state, a pre-treatment state, and a non-treatment state a state of the medical image processing apparatus is on the basis of the tool information, the treatment state being a state in which treatment is being performed on the region of interest with the tool, the pre-treatment state being a state in which preparation for the treatment is being performed, and the non-treatment state being a state other than the treatment state and the pre-treatment state, and in the display control process, in the treatment state and the pre-treatment state, cause the observation image to be displayed with the distinguishability being lower than in the non-treatment state.

In a medical image processing apparatus according to a third aspect, in the second aspect, the processor is configured to, in the display control process, in the treatment state, cause the observation image to be displayed with the distinguishability being lower than in the pre-treatment state.

In a medical image processing apparatus according to a fourth aspect, in the second or third aspect, the processor is configured to, in the tool information recognition process, determine which of the treatment state, the pre-treatment state, and the non-treatment state the state of the medical image processing apparatus is on the basis of the tool information including at least one of whether the tool has been inserted, a type of the tool inserted, a length of the insertion, an operation state of the tool, a distance between the tool and the region of interest, or whether the tool and the region of interest overlap each other in the observation image.

In a medical image processing apparatus according to a fifth aspect, in any one of the second to fourth aspects, the processor is configured to, in the display control process, in the treatment state and/or the pre-treatment state, cause a frame surrounding the region of interest to be displayed so as to be superimposed on the observation image.

In a medical image processing apparatus according to a sixth aspect, in any one of the second to fifth aspects, the processor is configured to, in the display control process, in the treatment state and the pre-treatment state, cause a symbol indicating the region of interest to be displayed so as to be superimposed on the observation image.

In a medical image processing apparatus according to a seventh aspect, in any one of the second to sixth aspects, the processor is configured to, in the display control process, in the treatment state and the pre-treatment state, cause at least one of a character, a figure, or a symbol to be displayed so as to be superimposed on part of the region of interest in the observation image.

In a medical image processing apparatus according to an eighth aspect, in any one of the fifth to seventh aspects, the processor is configured to, in the treatment state and the pre-treatment state, make distinguishability in the superimposed display lower than in the non-treatment state.

In a medical image processing apparatus according to a ninth aspect, in any one of the second to eighth aspects, the processor is configured to, in the display control process, in the treatment state and the pre-treatment state, cause the observation image to be displayed with the region of interest having a color and/or a brightness different from a color and/or a brightness of the region of interest in the non-treatment state.

An endoscope system according to a tenth aspect includes the medical image processing apparatus according to any one of the first to ninth aspects, the display device configured to display the observation image, and an endoscope that is to be inserted into the subject and that has an imaging unit configured to capture the observation image.

A medical image processing method according to an eleventh aspect of the present invention causes a computer to execute an image acquisition step of acquiring an observation image of a subject; a region-of-interest recognition step of recognizing a region of interest from the observation image; a tool information recognition step of recognizing tool information from the observation image, the tool information being information on a tool used for treatment of the subject; and a display control step of causing a display device to distinguishably display the observation image in a manner in which the region of interest has distinguishability based on a recognition result of the tool information. The medical image processing method according to the eleventh aspect and the following aspects can also be grasped as a method for operating a medical image processing apparatus.

In a medical image processing method according to a twelfth aspect, in the eleventh aspect, in the tool information recognition step, a determination is made as to which of a treatment state, a pre-treatment state, and a non-treatment state a state of a medical image processing apparatus is on the basis of the tool information, the treatment state being a state in which treatment is being performed on the region of interest with the tool, the pre-treatment state being a state in which preparation for the treatment is being performed, and the non-treatment state being a state other than the treatment state and the pre-treatment state, and in the display control step, in the treatment state and the pre-treatment state, the display device is caused to display the observation image with the distinguishability being lower than in the non-treatment state.

In a medical image processing method according to a thirteenth aspect, in the twelfth aspect, in the display control step, in the treatment state, the observation image is caused to be displayed with the distinguishability being lower than in the pre-treatment state.

In a medical image processing method according to a fourteenth aspect, in the twelfth or thirteenth aspect, in the tool information recognition step, a determination is made as to which of the treatment state, the pre-treatment state, and the non-treatment state the state of the medical image processing apparatus is on the basis of the tool information including at least one of whether the tool has been inserted, a type of the tool inserted, a length of the insertion, an operation state of the tool, a distance between the tool and the region of interest, or whether the tool and the region of interest overlap each other in the observation image.

A medical image processing program according to a fifteenth aspect causes a computer to execute the medical image processing method according to any one of the eleventh to fourteenth aspects. A non-transitory recording medium storing a computer-readable code of the medical image processing program according to the fifteenth aspect may be included in one aspect of the present invention.

DESCRIPTION OF THE PREFERRED EMBODIMENTS

Hereinafter, an embodiment of a medical image processing apparatus, a medical image processing method, an endoscope system, and a medical image processing program according to the present invention will be described in detail with reference to the accompanying drawings.

First Embodiment

Configuration of Endoscope System

Figure 1:
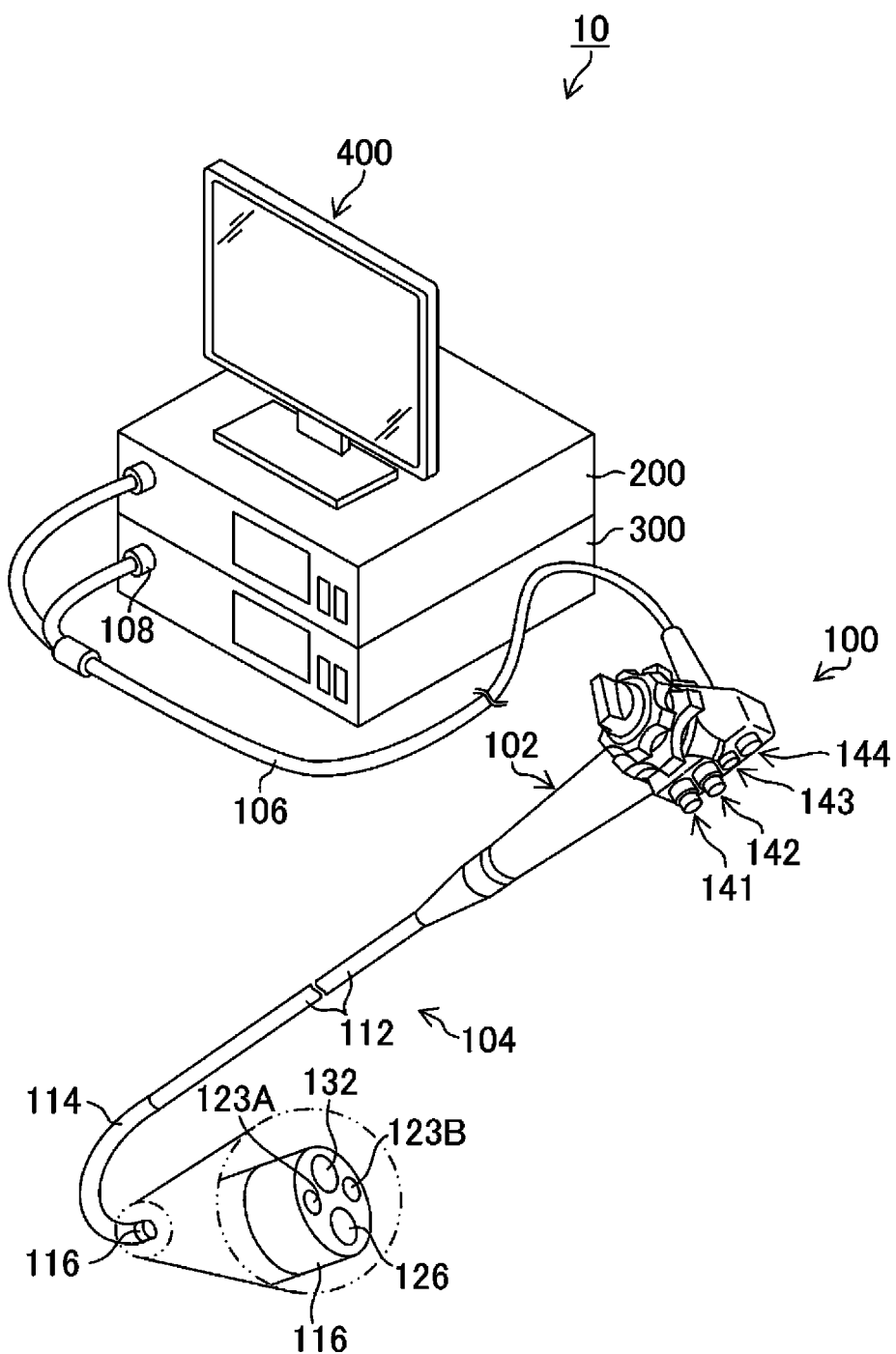
FIG. 1 is an external appearance diagram of an endoscope system according to a first embodiment.
Figure 2:
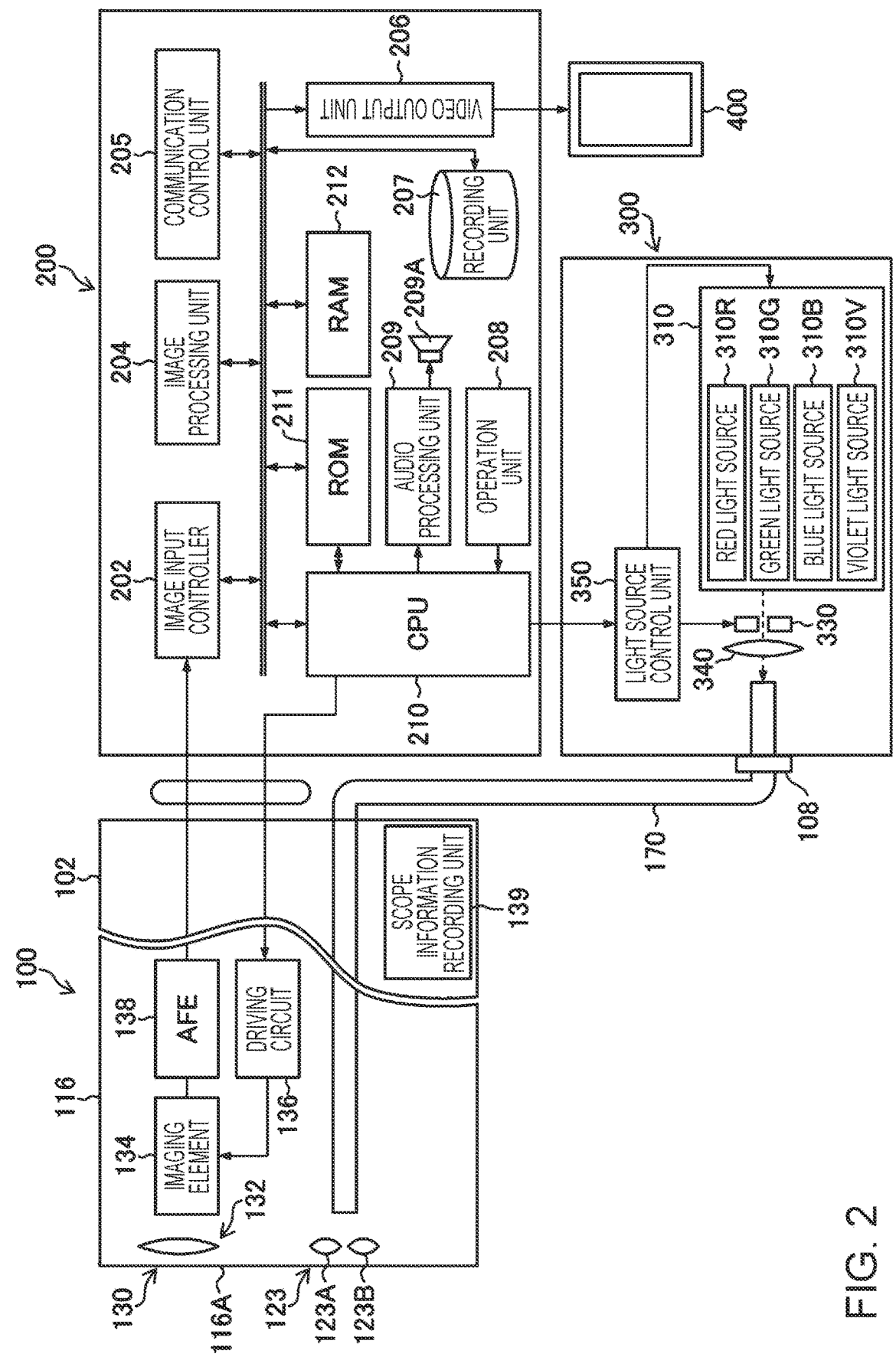
FIG. 2 is a block diagram illustrating the configuration of a main part of the endoscope system.

FIG. 1 is an external appearance diagram of an endoscope system 10 (an endoscope system), and FIG. 2 is a block diagram illustrating the configuration of a main part of the endoscope system 10. As illustrated in FIGS. 1 and 2, the endoscope system 10 is constituted by an endoscope 100 (an image acquiring unit, an endoscope), a medical image processing apparatus 200 (a medical image processing apparatus, a processor, a medical image acquiring unit, a region-of-interest recognizing unit, a tool information recognizing unit, a display control unit, a recording control unit), a light source apparatus 300 (a light source apparatus), and a monitor 400 (a display device, a display).

Configuration of Endoscope

The endoscope 100 includes a handheld operation section 102 and an insertion section 104 that communicates with the handheld operation section 102. An operator (a user) operates the handheld operation section 102 while grasping it and inserts the insertion section 104 into a body of a subject (a living body) to perform observation. The handheld operation section 102 is provided with an air/water supply button 141, a suction button 142, a function button 143 to which various functions are allocated, and an imaging button 144 for receiving an imaging instruction operation (a still image, a moving image).

The handheld operation section 102 is provided with a scope information recording unit 139 that records individual information (individual information, scope information) of the endoscope 100. The individual information includes, for example, information on the type (direct view, side view, or the like), the model, the individual identification number, the optical system characteristics (viewing angle, distortion, and so forth), and a tool (treatment tool or the like) used for treatment of a subject, of the endoscope 100. A scope information acquiring unit 230 (a scope information acquiring unit, an individual information acquiring unit; see FIG. 3) of an image processing unit 204 acquires the individual information, which is used for a process (an image acquisition process, a region-of-interest recognition process, a tool information recognition process, a display control process) performed by the medical image processing apparatus 200. The scope information recording unit 139 may be provided in another part, for example, in a light guide connector 108.

The insertion section 104 is constituted by a soft part 112, a bending part 114, and a tip rigid part 116, which are arranged in this order from the handheld operation section 102 side. That is, the bending part 114 is connected to a base end side of the tip rigid part 116, and the soft part 112 is connected to a base end side of the bending part 114. The handheld operation section 102 is connected to a base end side of the insertion section 104. The user is able to change the orientation of the tip rigid part 116 in an up, down, left, or right direction by causing the bending part 114 to bend by operating the handheld operation section 102. The tip rigid part 116 is provided with an imaging optical system 130, an illumination unit 123, a forceps port 126, and so forth (see FIGS. 1 and 2).

During observation or treatment, an operation of an operation unit 208 (see FIG. 2) enables white light and/or narrow-band light (one or more of red narrow-band light, green narrow-band light, blue narrow-band light, and violet narrow-band light) to be radiated from illumination lenses 123A and 123B of the illumination unit 123. In addition, an operation of the air/water supply button 141 enables washing water to be ejected from a water supply nozzle that is not illustrated, so that an imaging lens 132 (an imaging lens, an imaging unit) of the imaging optical system 130 and the illumination lenses 123A and 123B can be washed. The forceps port 126 opening in the tip rigid part 116 communicates with a pipe line that is not illustrated, so that a treatment tool that is not illustrated and is for extirpating a tumor or the like can be inserted into the pipe line and necessary treatment can be given to a subject by moving the treatment tool forward or backward as appropriate.

As illustrated in FIGS. 1 and 2, the imaging lens 132 (an imaging unit) is disposed on a distal-end-side surface 116A of the tip rigid part 116. An imaging element 134 (an imaging element, an image acquiring unit) of a complementary metal-oxide semiconductor (CMOS) type, a driving circuit 136, and an analog front end (AFE) 138 are disposed behind the imaging lens 132, and these elements output an image signal. The imaging element 134 is a color imaging element and includes a plurality of pixels constituted by a plurality of light-receiving elements arranged in a matrix (arranged two-dimensionally) in a specific pattern arrangement (Bayer arrangement, X-Trans (registered trademark) arrangement, honeycomb arrangement, or the like). Each pixel of the imaging element 134 includes a microlens, a red (R), green (G), or blue (B) color filter, and a photoelectric conversion unit (a photodiode or the like). An image sensor including the imaging element 134, the driving circuit 136, and the AFE 138 integrated into one package may be used. The imaging optical system 130 is capable of generating a color image from pixel signals of three colors, red, green, and blue, and is also capable of generating an image from pixel signals of any one or two colors among red, green, and blue. The imaging element 134 may be of an XY address type or a charge coupled device (CCD) type. Each pixel of the imaging element 134 may further include a violet color filter corresponding to a violet light source 310V and/or an infrared filter corresponding to an infrared light source.

An optical image of a subject is formed on a light-receiving surface (an imaging surface) of the imaging element 134 by the imaging lens 132, converted into an electric signal, output to the medical image processing apparatus 200 through a signal cable that is not illustrated, and converted into a video signal. Accordingly, an endoscopic image (an observation image, a medical image) of the photographic subject is displayed on the monitor 400, which is connected to the medical image processing apparatus 200.

The illumination lenses 123A and 123B of the illumination unit 123 are provided next to the imaging lens 132 on the distal-end-side surface 116A of the tip rigid part 116. An emission end of a light guide 170, which will be described below, is disposed behind the illumination lenses 123A and 123B. The light guide 170 extends through the insertion section 104, the handheld operation section 102, and a universal cable 106, and an incidence end of the light guide 170 is located in the light guide connector 108.

A user performs imaging (under control of a medical image acquiring unit 220) at a determined frame rate while inserting or removing the endoscope 100 (the insertion section 104) having the above-described configuration into or from a living body as a subject, thereby being capable of sequentially capturing time-series images of the inside of the living body.

Configuration of Light Source Apparatus

As illustrated in FIG. 2, the light source apparatus 300 is constituted by a light source 310 for illumination, a diaphragm 330, a condenser lens 340, a light source control unit 350, and so forth, and causes observation light to enter the light guide 170. The light source 310 includes a red light source 310R, a green light source 310G, a blue light source 310B, and the violet light source 310V that radiate red narrow-band light, green narrow-band light, blue narrow-band light, and violet narrow-band light, respectively, and is capable of radiating red narrow-band light, green narrow-band light, blue narrow-band light, and violet narrow-band light. The illuminance of observation light from the light source 310 is controlled by the light source control unit 350, which is capable of changing (increasing or decreasing) the illuminance of observation light or stopping illumination as necessary.

The light source 310 is capable of emitting red narrow-band light, green narrow-band light, blue narrow-band light, and violet narrow-band light in any combination. For example, the light source 310 is capable of simultaneously emitting red narrow-band light, green narrow-band light, blue narrow-band light, and violet narrow-band light to radiate white light (normal light) as observation light, and is also capable of emitting any one or two of red narrow-band light, green narrow-band light, blue narrow-band light, and violet narrow-band light to radiate narrow-band light (special light). The light source 310 may further include an infrared light source that radiates infrared light (an example of narrow-band light). Alternatively, with use of a light source that radiates white light and a filter that allows white light and each narrow-band light to pass therethrough, white light or narrow-band light may be radiated as observation light.

Wavelength Range of Light Source

The light source 310 may be a light source that generates light in a white range or light in a plurality of wavelength ranges as the light in the white range, or may be a light source that generates light in a specific wavelength range narrower than the white wavelength range. The specific wavelength range may be a blue range or green range in a visible range, or may be a red range in the visible range. In a case where the specific wavelength range is the blue range or green range in the visible range, the specific wavelength range may include a wavelength range of 390 nm or more and 450 nm or less or a wavelength range of 530 nm or more and 550 nm or less, and the light in the specific wavelength range may have a peak wavelength in the wavelength range of 390 nm or more and 450 nm or less or the wavelength range of 530 nm or more and 550 nm or less. In a case where the specific wavelength range is the red range in the visible range, the specific wavelength range may include a wavelength range of 585 nm or more and 615 nm or less or a wavelength range of 610 nm or more and 730 nm or less, and the light in the specific wavelength range may have a peak wavelength in the wavelength range of 585 nm or more and 615 nm or less or the wavelength range of 610 nm or more and 730 nm or less.

The above-described specific wavelength range may include a wavelength range in which a light absorption coefficient is different between oxyhemoglobin and deoxyhemoglobin, and the light in the specific wavelength range may have a peak wavelength in the wavelength range in which the light absorption coefficient is different between oxyhemoglobin and deoxyhemoglobin. In this case, the specific wavelength range may include a wavelength range of 400±10 nm, a wavelength range of 440±10 nm, a wavelength range of 470±10 nm, or a wavelength range of 600 nm or more and 750 nm, and the light in the specific wavelength range may have a peak wavelength in the wavelength range of 400±10 nm, the wavelength range of 440±10 nm, the wavelength range of 470±10 nm, or the wavelength range of 600 nm or more and 750 nm or less.

The wavelength range of the light generated by the light source 310 may include a wavelength range of 790 nm or more and 820 nm or less or a wavelength range of 905 nm or more and 970 nm or less, and the light generated by the light source 310 may have a peak wavelength in the wavelength range of 790 nm or more and 820 nm or less or the wavelength range of 905 nm or more and 970 nm or less.

Alternatively, the light source 310 may include a light source that radiates excitation light whose peak is 390 nm or more and 470 nm or less. In this case, a medical image (an inside-of-living-body image) having information about fluorescence emitted by a fluorescent substance in a subject (a living body) can be acquired. In the case of acquiring a fluorescence image, a pigment for a fluorescence method (fluorescein, acridine orange, or the like) may be used.

It is preferable that the type of the light source 310 (a laser light source, a xenon light source, a light-emitting diode (LED) light source, or the like), the wavelength of the light source 310, the presence or absence of a filter for the light source 310, and so forth be determined in accordance with the type, area, purpose of observation, or the like of a photographic subject. It is also preferable that, during observation, the wavelengths of observation light be combined and/or switched in accordance with the type, area, purpose of observation, or the like of a photographic subject. In the case of switching the wavelength, for example, a disc-shaped filter (a rotary color filter) that is disposed in front of the light source and that is provided with a filter for transmitting or blocking light of a specific wavelength may be rotated to switch the wavelength of light to be radiated.

The imaging element used to carry out the present invention is not limited to a color imaging element in which color filters are disposed for the individual pixels, such as the imaging element 134, and may be a monochrome imaging element. In the case of using a monochrome imaging element, imaging can be performed in a frame sequential (color sequential) manner by sequentially switching the wavelength of observation light. For example, the wavelength of outgoing observation light may be sequentially switched among violet, blue, green, and red, or wide-band light (white light) may be radiated and the wavelength of outgoing observation light may be switched by using a rotary color filter (red, green, blue, violet, and the like). Alternatively, one or a plurality of types of narrow-band light (green, blue, violet, and the like) may be radiated and the wavelength of outgoing observation light may be switched by using a rotary color filter (green, blue, violet, and the like). The narrow-band light may be infrared light of two or more different wavelengths (first narrow-band light and second narrow-band light).

As a result of connecting the light guide connector 108 (see FIGS. 1 and 2) to the light source apparatus 300, observation light radiated by the light source apparatus 300 is transmitted through the light guide 170 to the illumination lenses 123A and 123B and is radiated from the illumination lenses 123A and 123B to an observation range.

Configuration of Medical Image Processing Apparatus

The configuration of the medical image processing apparatus 200 will be described with reference to FIG. 2. In the medical image processing apparatus 200, an image input controller 202 receives an image signal output from the endoscope 100, the image processing unit 204 (a processor, a computer) performs necessary image processing thereon, and a video output unit 206 outputs a resulting image signal. Accordingly, an observation image (a medical image, an endoscopic image, an inside-of-living-body image) is displayed on the monitor 400 (a display device). These processing operations are performed under control by a central processing unit (CPU) 210 (a processor, a computer). A communication control unit 205 controls communication, for acquiring a medical image, with a hospital information system (HIS), a hospital local area network (LAN), and/or an external system or network that are not illustrated.

Functions of Image Processing Unit

Figure 3:
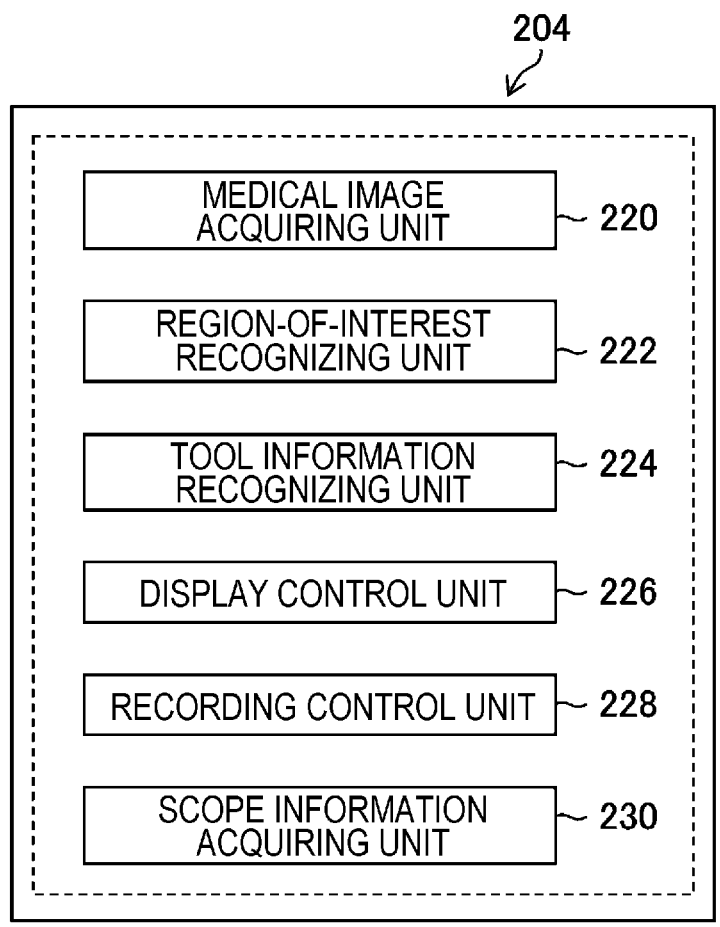
FIG. 3 is a functional block diagram of an image processing unit.

FIG. 3 is a functional block diagram of the image processing unit 204. The image processing unit 204 includes the medical image acquiring unit 220 (a medical image acquiring unit), a region-of-interest recognizing unit 222 (a region-of-interest recognizing unit), a tool information recognizing unit 224 (a tool information recognizing unit), a display control unit 226 (a display control unit), a recording control unit 228 (a recording control unit), and the scope information acquiring unit 230 (a scope information acquiring unit). Processes using these functions will be described below in detail.

The image processing unit 204 is capable of performing, with the above-described functions, recognition of a medical image, determination of a biopsy state or the like, calculation of a feature quantity, a process of emphasizing or reducing a component of a specific frequency band, and a process of emphasizing or deemphasizing a specific target (a region of interest, blood vessels at a desired depth, or the like). The image processing unit 204 may include a special-light image acquiring unit that acquires a special-light image having information about a specific wavelength range on the basis of a normal-light image that is acquired by radiating light in the white range or light in a plurality of wavelength ranges as the light in the white range. In this case, a signal in the specific wavelength range can be acquired through computation based on color information of RGB (R: red, G: green, B: blue) or CMY (C: cyan, M: magenta, Y: yellow) included in the normal-light image. In addition, the image processing unit 204 may include a feature quantity image generating unit that generates a feature quantity image through computation based on at least one of a normal-light image that is acquired by radiating light in the white range or light in a plurality of wavelength ranges as the light in the white range or a special-light image that is acquired by radiating light in a specific wavelength range, and may acquire and display the feature quantity image as a medical image. The above-described processing is performed under control by the CPU 210.

Implementation of Functions by Various Types of Processors

The functions of the above-described units of the image processing unit 204 can be implemented by using various types of processors and a recording medium. The various types of processors include, for example, a central processing unit (CPU) which is a general-purpose processor that executes software (program) to implement various functions. Also, the various types of processors include a graphics processing unit (GPU) which is a processor dedicated to image processing, and a programmable logic device (PLD) which is a processor whose circuit configuration is changeable after manufacturing, such as a field programmable gate array (FPGA). In the case of performing learning and recognition of images as in the present invention, the configuration using a GPU is effective. Furthermore, the various types of processors include a dedicated electric circuit which is a processor having a circuit configuration designed exclusively for executing specific processing, such as an application specific integrated circuit (ASIC).

The function of each unit may be implemented by one processor or may be implemented by a plurality of processors of the same type or different types (for example, a combination of a plurality of FPGAs, a combination of a CPU and an FPGA, or a combination of a CPU and a GPU). A plurality of functions may be implemented by one processor. A first example of implementing a plurality of functions by one processor is that a combination of one or more CPUs and software constitute one processor and the one processor implements the plurality of functions, as represented by a computer. A second example is that a processor that implements the functions of an entire system by one integrated circuit (IC) chip is used, as represented by a system on chip (SoC). In this way, various functions are configured as a hardware structure by using one or more of the above-described various types of processors. Furthermore, the hardware structure of the various types of processors is, more specifically, electric circuitry formed by combining circuit elements such as semiconductor elements. The electric circuitry may be electric circuitry that implements the above-described functions by using logical disjunction, logical conjunction, logical negation, exclusive disjunction, and logical operation as a combination thereof.

When the above-described processor or electric circuitry executes the software (program), the code of the software to be executed that is readable by a computer (for example, the various types of processors or electric circuitry constituting the image processing unit 204, and/or a combination thereof) is stored in a non-transitory recording medium, such as a read only memory (ROM) 211 or a flash memory (not illustrated), and the computer refers to the software. The software stored in the non-transitory recording medium includes a program for executing the medical image processing method (a method for operating a medical image processing apparatus) according to the present invention and data used in the execution (data related to acquisition of a medical image, data used to define a biopsy state or the like and set a mode of distinguishable display, parameters used in a recognizing unit, and so forth). The code may be recorded on a non-transitory recording medium, such as a magneto-optical recording device of various types or a semiconductor memory, instead of the ROM 211. In the processing using the software, a random access memory (RAM) 212 may be used as a transitory storage region, for example, and data stored in an electrically erasable and programmable read only memory (EEPROM) that is not illustrated can be referred to, for example. A recording unit 207 may be used as a "non-transitory recording medium".

The read only memory (ROM) 211 is a nonvolatile storage element (a non-transitory recording medium) and stores a computer-readable code of a program that causes the CPU 210 and/or the image processing unit 204 (a computer) to execute various image processing methods (including the medical image processing method according to the present invention). The random access memory (RAM) 212 is a storage element for temporary storage in various processing operations and can be used as a buffer when acquiring an image. An audio processing unit 209 outputs a message (audio) about medical image processing, area recognition, reporting, or the like from a speaker 209A (a reporting unit, a speaker) under control by the CPU 210 and the image processing unit 204. The program may be recorded on an external recording medium (not illustrated) and distributed, and may be installed from the recording medium by the CPU 210. Alternatively, the program may be stored in a server or the like connected to a network in a state of being accessible from the outside, and may be downloaded to the ROM 211 by the CPU 210 in response to a request, and installed and executed.

Operation Unit

The operation unit 208 can be constituted by devices such as a keyboard and a mouse that are not illustrated. A user is able to provide an instruction to execute the medical image processing method or set a condition necessary for the execution (for example, definition of a treatment state or the like, or the mode of distinguishable display described below) via the operation unit 208.

Recognizing Unit Using Neural Network

In the first embodiment, the region-of-interest recognizing unit 222 and the tool information recognizing unit 224 can be constituted by using a trained model (a model trained by using an image set constituted by captured images of a living body), such as a neural network. The region-of-interest recognizing unit 222 recognizes a region of interest from an observation image (a region-of-interest recognition process). The tool information recognizing unit 224 recognizes tool information (a treatment state, a pre-treatment state, a non-treatment state) from the observation image (a tool information recognition process). Specifically, the tool information recognizing unit 224 determines, from an observation image, whether a tool has been inserted, the amount of insertion, the distance between the tool and a region of interest, and so forth. On the basis of the result, the tool information recognizing unit 224 determines which of a treatment state, a pre-treatment state, and a non-treatment state the state of the endoscope 100 (the medical image processing apparatus 200, the endoscope system 10) is. "Treatment state", "pre-treatment state", and "non-treatment state" can be respectively grasped as, for example, "a state in which treatment is actually being performed on a region of interest by using a tool (a state in which a user is performing treatment)", "a state in which a user is preparing for treatment, such as inserting a tool, or a state in which the distance between a tool and a region of interest is short", and "a state in which an operation for treatment (insertion of a tool, etc.) is not being performed (a state in which a user is not performing treatment or is not preparing therefor), or a state in which the distance between a tool and a region of interest is long (a state other than the treatment state and the pre-treatment state)". Classification may be performed between the treatment state and the non-treatment state, without distinguishing the treatment state and the pre-treatment state from each other.

"Treatment" includes biopsy (cutting out a region suspected to be a lesion and submitting it for examination such as pathological examination), and endoscopic resection such as endoscopic submucosal dissection (ESD) or endoscopic mucosal resection (EMR). "Tool" includes a tool for biopsy, and a tool used for ESD, EMR, or the like.

Example of Configuration of Recognizing Unit

Figure 4A:
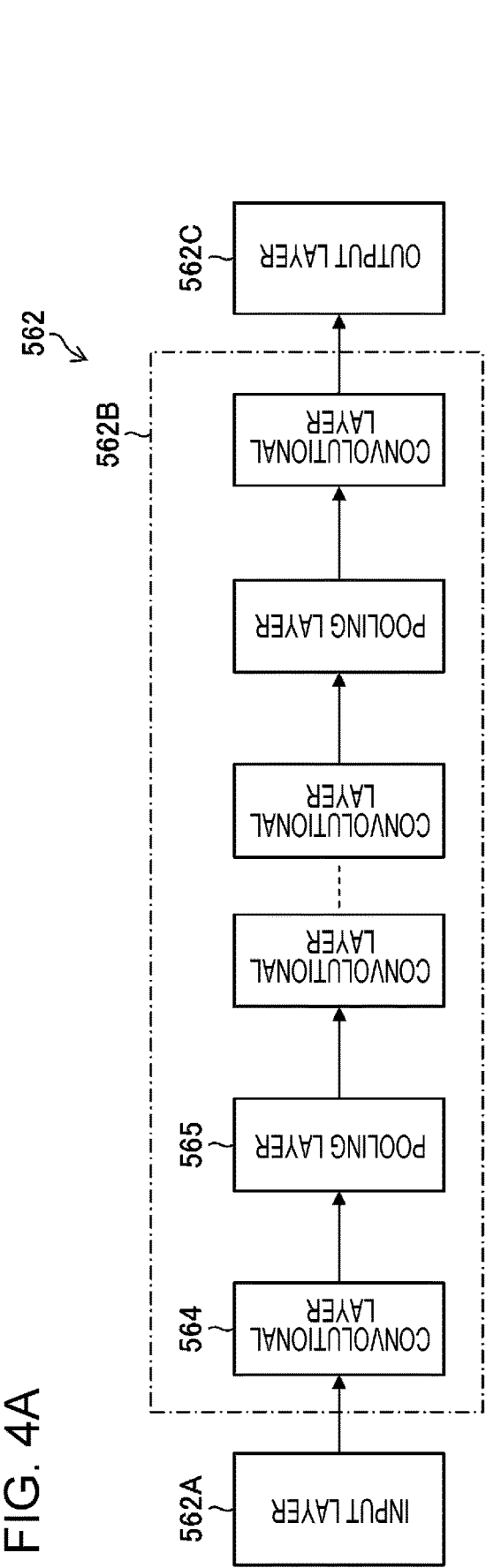
FIGS. 4A and 4B are diagrams each illustrating the configuration of a convolutional neural network.
Figure 4B:
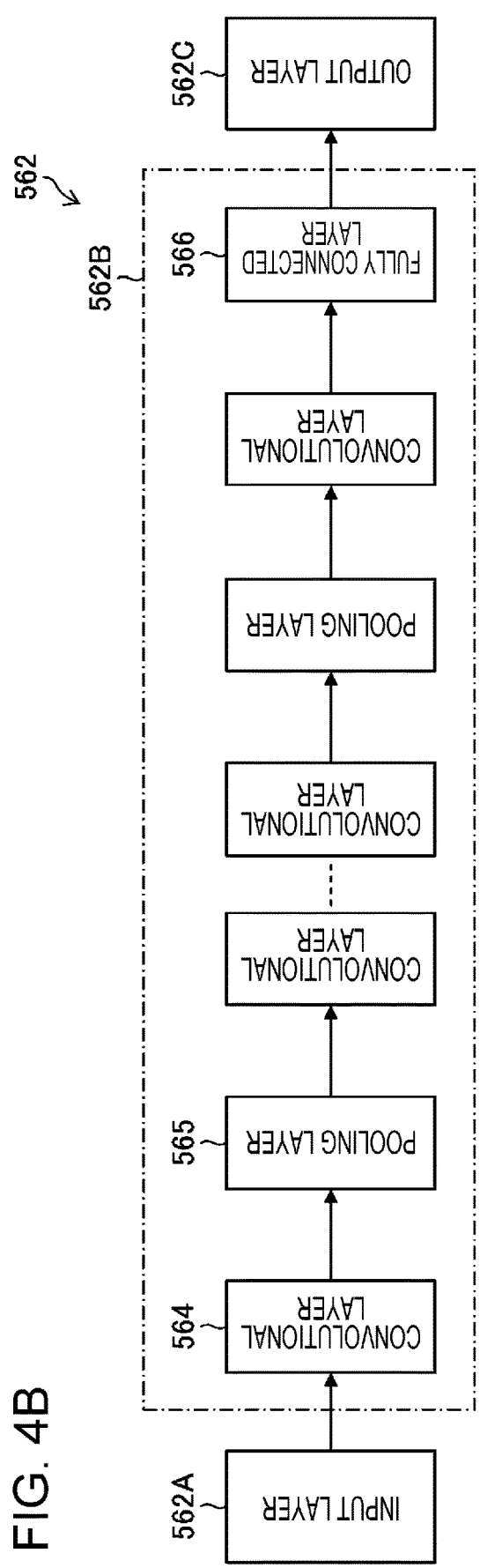

Hereinafter, a description will be given of the configuration of the recognizing unit in the case of performing recognition (detection, discrimination, or the like) by using a convolutional neural network (CNN) as a neural network. FIGS. 4A and 4B are diagrams each illustrating the configuration of a CNN 562 (neural network). In the example illustrated in FIG. 4A, the CNN 562 has an input layer 562A, an intermediate layer 562B, and an output layer 562C. The input layer 562A receives an endoscopic image (a medical image, an observation image) acquired by the medical image acquiring unit 220 and outputs a feature quantity. The intermediate layer 562B includes convolutional layers 564 and pooling layers 565, and receives the feature quantity output from the input layer 562A and calculates another feature quantity. These layers have a structure in which a plurality of "nodes" are connected by "edges". Weighting coefficients applied to an input image are associated with the nodes and edges and are stored in a weighting coefficient storage unit that is not illustrated. The values of the weighting coefficients change as learning progresses.

Processing in Intermediate Layer

The intermediate layer 562B calculates a feature quantity through convolutional operation and pooling processing. The convolutional operation performed in the convolutional layer 564 is processing of acquiring a feature map through convolutional operation using a filter, and plays a role in feature extraction such as edge extraction from an image. As a result of the convolutional operation using a filter, one-channel (one) "feature map" is created for one filter. The size of the "feature map" is reduced as convolution is performed in each layer in the case of being scaled down by convolution. The pooling processing performed in the pooling layer 565 is processing of reducing (or enlarging) the feature map output through the convolutional operation to create a new feature map, and plays a role in giving robustness so that the extracted feature is not affected by parallel movement or the like. The intermediate layer 562B can be constituted by one or a plurality of layers that perform these processing operations. The CNN 562 may be configured without a pooling layer 565.

The CNN 562 may include a fully connected layer 566 as in the example illustrated in FIG. 4B. The layer configuration of the CNN 562 is not limited to the configuration in which the convolutional layers 564 and the pooling layers 565 are alternately arranged, and may include a plurality of consecutive convolutional layers 564 or pooling layers 565 (for example, convolutional layers 564).

Figure 5:
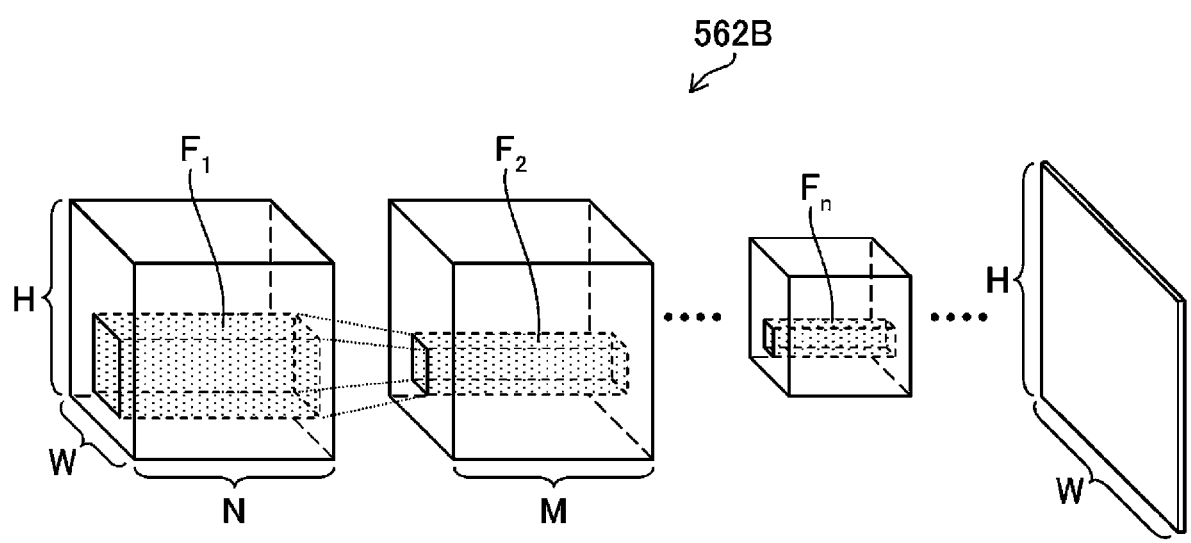
FIG. 5 is a diagram illustrating a state of convolutional processing using filters.

FIG. 5 is a diagram illustrating a state of convolutional processing using filters illustrated in FIGS. 4A and 4B. In the first convolutional layer of the intermediate layer 562B, convolutional operation of an image set constituted by a plurality of medical images (a learning image set in the case of learning, and an area recognition image set in the case of area recognition) and a filter $F_1$ is performed. The image set is constituted by N (N-channel) images each having an image size in which the height is represented by H and the width is represented by W. In the case of inputting normal-light images, the images constituting an image set are three-channel images of red (R), green (G), and blue (B). The filter $F_1$ convoluted with this image set has a filter size of 5×5×N in the case of the filter having size 5 (5×5), for example, because the image set has N channels (N images). As a result of convolutional operation using the filter $F_1$, one-channel (one) "feature map" is created for one filter $F_1$. A filter $F_2$ used in the second convolutional layer has a filter size of 3×3×M in the case of the filter having size 3 (3×3), for example.

As in the first convolutional layer, in the second to n-th convolutional layers, convolutional operations using filters $F_2$ to $F_n$ are performed, respectively. The size of the "feature map" in the n-th convolutional layer is smaller than the size of the "feature map" in the second convolutional layer because scaling-down is performed in the convolutional layers or pooling layers in the preceding stages.

In the layers of the intermediate layer 562B, lower-order feature extraction (extraction of edges or the like) is performed in a convolutional layer near the input side, and higher-order feature extraction (extraction of features about the shape, structure, and the like of a recognition target) is performed near the output side.

The intermediate layer 562B may include a layer for performing batch normalization in addition to the convolutional layers 564 and the pooling layers 565. Batch normalization processing is the processing of normalizing a data distribution in units of mini batches for performing learning, and plays a role in quickly performing learning, reducing dependency on an initial value, suppressing overtraining, and so forth.

The output layer 562C outputs the feature quantity calculated by the intermediate layer 562B in a form suitable for area recognition. The output layer 562C may include a fully connected layer.

The region-of-interest recognition process by the region-of-interest recognizing unit 222 and the tool information recognition process by the tool information recognizing unit 224 may be performed by a common neural network or may be performed by different neural networks.

Distinguishable Display of Biopsy Target Region

In the case of observing a disease in a range by using an endoscope system or the like, a region in which the disease is progressing is biopsied and subjected to a pathological examination in many cases. In this case, a biopsy target region (a region of interest or the like) is detected by a medical image processing apparatus, and a region suitable for biopsy is displayed. However, in the case of performing biopsy using a tool (a treatment tool), a doctor grasps a biopsy position when having inserted the tool. If distinguishable display (distinguishability) for the target region is maintained in that state (see FIG. 9 described below), biopsy by the doctor may be disturbed. Accordingly, in the present invention, tool information in an observation image is recognized, and the observation image is distinguishability displayed on a display device in a manner in which a biopsy target region (a region of interest) has distinguishability based on the recognition result of the tool information, as described below in detail.

In the present invention, "distinguishability" means that "a user such as a doctor who visually recognizes an observation image is able to distinguish a region of interest from other regions". The user is able to distinguish a region of interest from other regions more clearly as the distinguishability increases. "Distinguishable display" means that an observation image is displayed in a state in which the distinguishability of a region of interest is increased, and specifically includes, as illustrated in display examples described below, emphasis of the region of interest (for example, filling or display of contour), and information indicating the region of interest (for example, display of a frame surrounding the region of interest or display of a figure or symbol indicating the region of interest).

Individual Processes of Medical Image Processing Method

Figure 6:
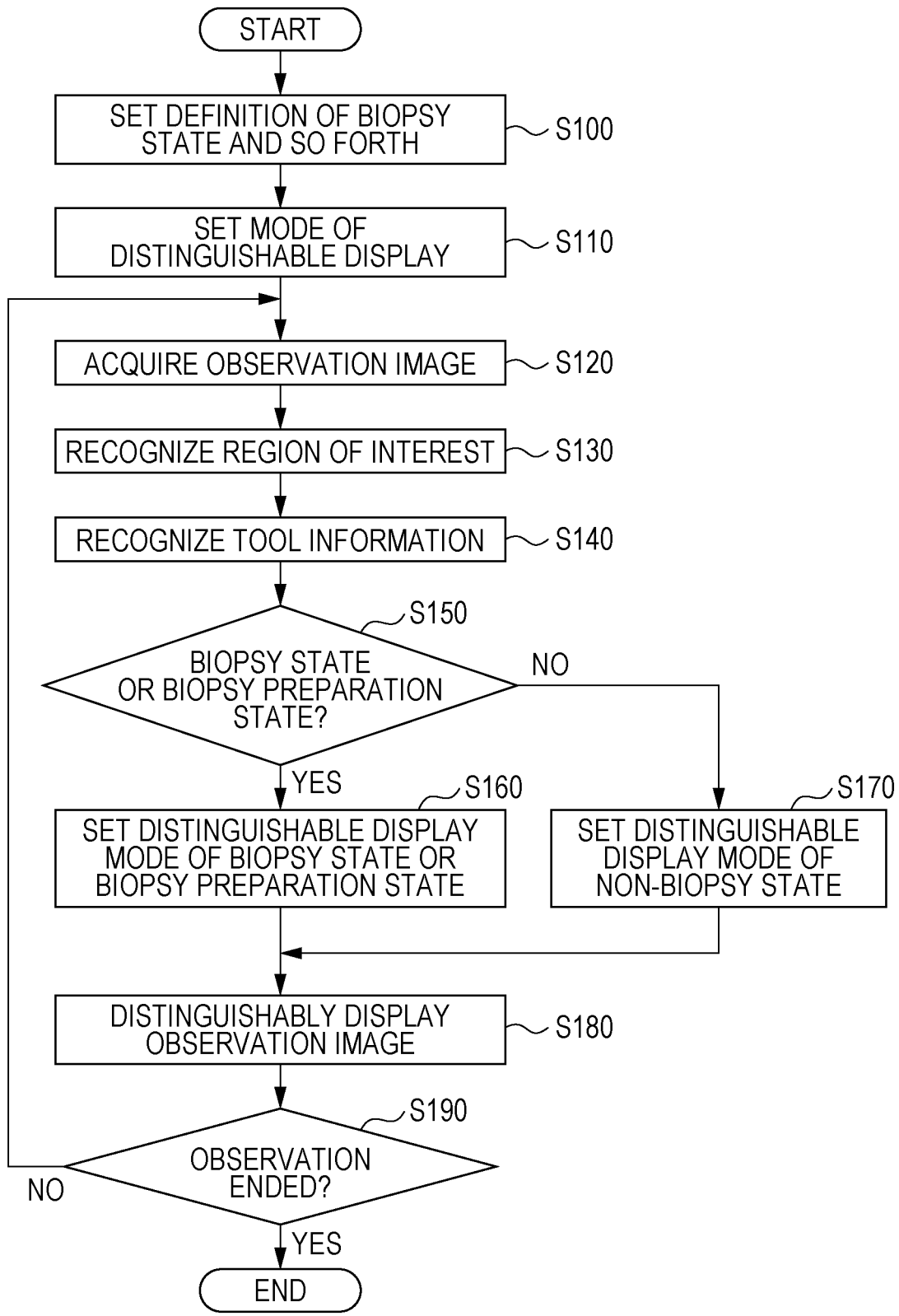
FIG. 6 is a flowchart illustrating a procedure of a medical image processing method according to the first embodiment.

FIG. 6 is a flowchart illustrating a procedure of a medical image processing method (a method for operating a medical image processing apparatus) according to the first embodiment. It is assumed that learning of the CNN 562 using learning data has been executed.

Definition of Biopsy State and so forth

The image processing unit 204 sets the definition of a biopsy state and so forth in accordance with a user operation performed via the operation unit 208 (step S100: a definition setting step). The user is able to perform a setting operation via a screen 700 (displayed on the monitor 400) illustrated in FIG. 7.

The screen 700 has regions 702, 710, and 720 in which radio buttons and numerical value input regions are disposed. The user is able to set whether to perform determination of individual items by operating the radio buttons, and is able to input numerical values serving as determination criteria for the individual items. For example, the user is able to turn ON a radio button 703A for "tool is inserted XX mm or more" in the region 702 (a region for defining a biopsy state) and input a numerical value to a region 703B (10 mm in the example in FIG. 7), to set "determine that the state is the biopsy state (treatment state) if the tool insertion amount is 10 mm or more". The tool information recognizing unit 224 is capable of determining that "a tool and a region of interest overlap each other" if the distance between the tool and the region of interest in an observation image is zero or is smaller than or equal to a threshold value.

Also, the user is able to set determining of a biopsy state on the basis of the distance between a tool and a region of interest, and the usage state (operation state) of the tool. "The tool is being used (operated)" includes, for example, a case where the blades of forceps are open and a case where the ring of the wire of a snare contracts (see FIGS. 9 to 15B described below). Different definitions may be set according to the types of tools (forceps, snare, brush, and so forth).

Figure 7:
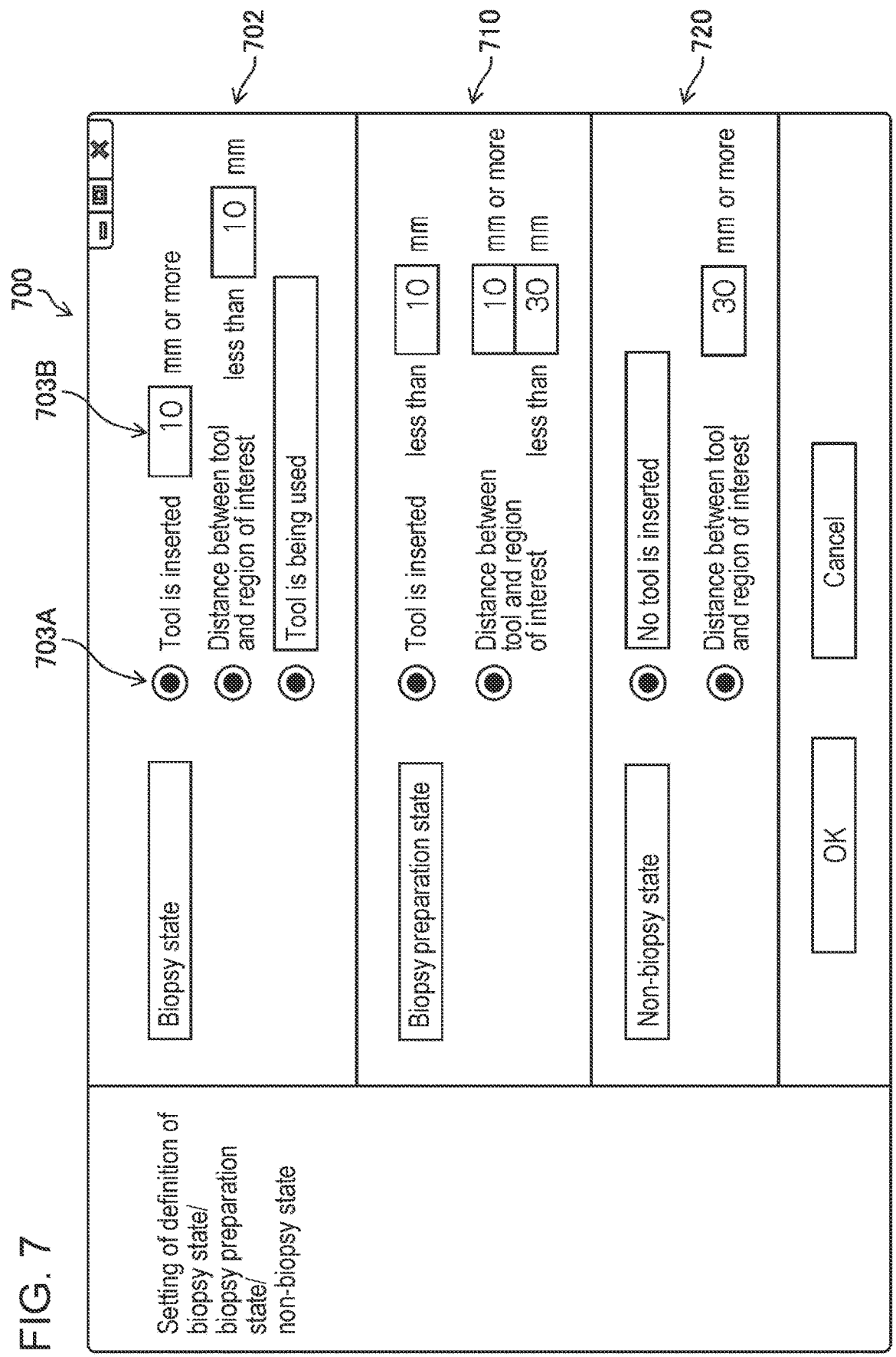
FIG. 7 is a diagram illustrating an example of a screen for setting the definition of a treatment state and so forth.

The user is able to perform such operations for a biopsy state (the region 702), a biopsy preparation state (the region 710), and a non-biopsy state (the region 720). Although FIG. 7 illustrates an example in which tool information is classified in three stages of "biopsy state (treatment state)", "biopsy preparation state (pre-treatment state)", and "non-biopsy state (non-treatment state)", tool information may be classified in two stages of the biopsy state and the non-biopsy state.

The user is able to perform turning ON/OFF and input of numerical values of such determination criteria for a plurality of items. In a case where there are a plurality of items that are turned ON, the tool information recognizing unit 224 (a processor) is capable of determining that "the state is the biopsy state (or the biopsy preparation state or the non-biopsy state)" if all the conditions corresponding to the items are satisfied. In the example in FIG. 7, the tool information recognizing unit 224 is capable of determining that "the state is the biopsy state" if the tool insertion amount is 10 mm or more, the distance between the tool and the region of interest is less than 10 mm, and the tool is being used.

Setting of Mode of Distinguishable Display

The display control unit 226 (a processor) sets the mode of distinguishable display in accordance with a user operation performed via the operation unit 208 (step S110: a display control step). The user is able to perform a setting operation via a screen 750 (displayed on the monitor 400) illustrated in FIG. 8.

Figure 8:
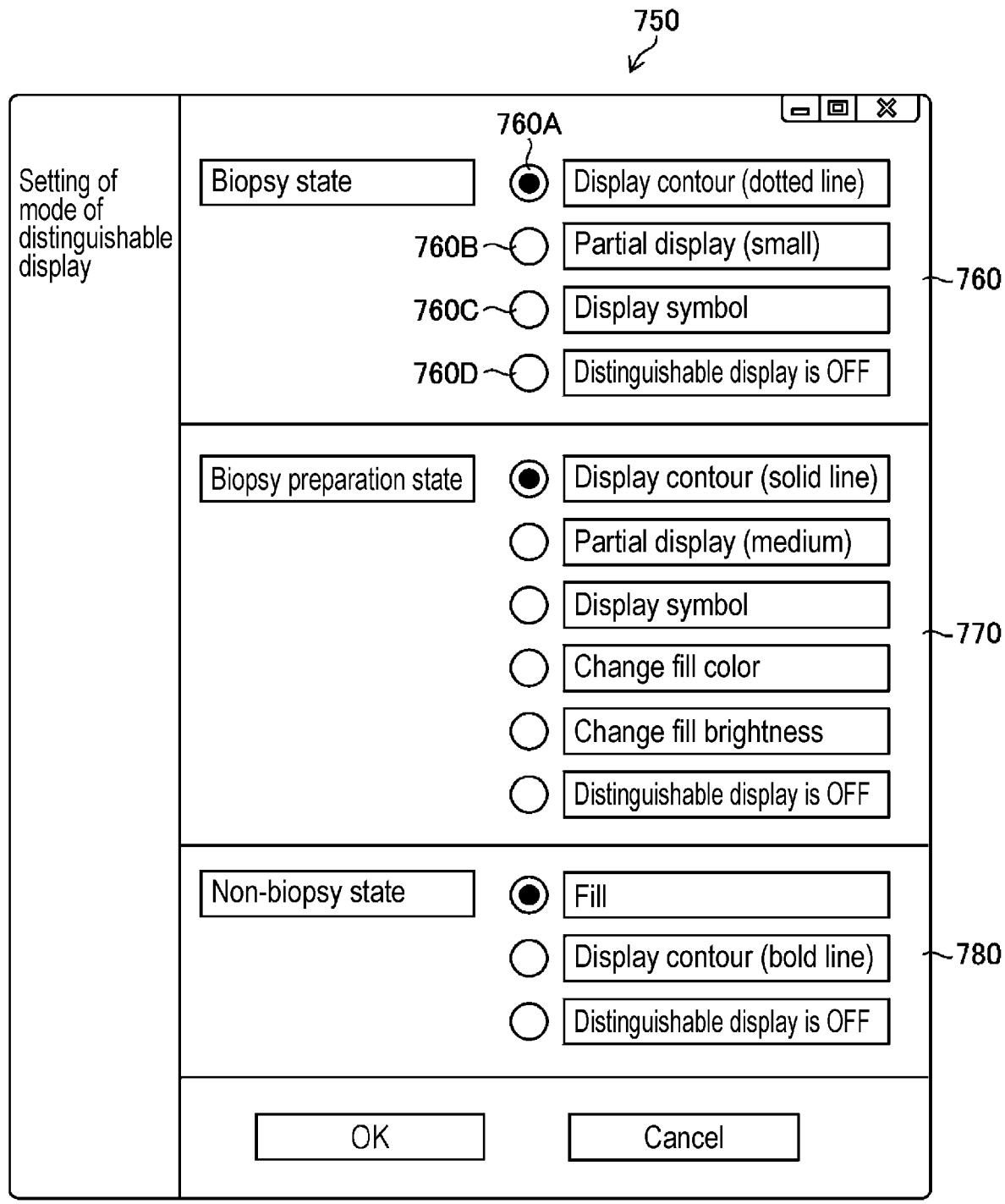
FIG. 8 is a diagram illustrating an example of a screen for setting a mode of distinguishable display.

As illustrated in FIG. 8, the screen 750 has regions 760, 770, and 780 in which radio buttons are disposed. These regions are regions for setting the modes of distinguishable display in the biopsy state, the biopsy preparation state, and the non-biopsy state, respectively. The user is able to set the mode of distinguishable display by operating a radio button in each region. The region 760 for the biopsy state is provided with radio buttons 760A to 760D. For example, when the radio button 760A is turned ON, a region of interest is displayed with the contour thereof indicated by a dotted line in the biopsy state. Similarly, the user is able to set the modes of distinguishable display in the biopsy preparation state and the non-biopsy state by using radio buttons in the regions 770 and 780.

By operating the above-described radio buttons or the like, the user is able to set the mode of distinguishable display in which the distinguishability of a region of interest is lower in the biopsy state and the biopsy preparation state than in the non-biopsy state. The user may make a setting so that the distinguishability is lower in the biopsy state than in the biopsy preparation state. The tool information recognizing unit 224 (a processor) may output a warning message if the distinguishability in the biopsy state and the biopsy preparation state is not lower than the distinguishability in the non-biopsy state in the user setting, or may set, in response to a display mode being set in any state, the display mode in another state accordingly (the distinguishability of a region of interest in the biopsy state and the biopsy preparation state is made lower than in the non-biopsy state).

As described above, in the endoscope system 10 (an endoscope system), the user is able to set the definition of the biopsy state and so forth and the mode of distinguishable display as necessary. The settings of the definition of the biopsy state and so forth and the mode of distinguishable display may be made not only at start of medical image processing but also at any timing during the processing. Furthermore, the settings of the definition of the biopsy state and so forth and the mode of distinguishable display may be automatically made by the endoscope system 10 independently of a user operation.

Acquisition of Endoscopic Image

The medical image acquiring unit 220 (a processor) acquires a time-series endoscopic image (an observation image, a medical image) (step S120: an image acquisition step, an image acquisition process). The medical image acquiring unit 220 may acquire an endoscopic image captured by the endoscope 100, or may acquire an endoscopic image recorded in the recording unit 207. The recording control unit 228 is capable of recording the acquired endoscopic image in the recording unit 207.

Recognition of Region of Interest and Tool Information

The region-of-interest recognizing unit 222 (a processor) recognizes a region of interest from an observation image by using the CNN 562 (step S130: a region-of-interest recognition step, a region-of-interest recognition process). The tool information recognizing unit 224 (a processor) recognizes tool information from the observation image by using the CNN 562 (step S140: a tool information recognition step, a tool information recognition process). The tool information includes at least one of whether a tool inserted through the pipe line communicating with the forceps port 126 of the endoscope 100 is inserted into a subject, the type of the tool inserted into the subject, the length of insertion (the length of the tool inserted into the subject), the operation state of the tool inserted into the subject, the distance between the tool inserted into the subject and a region of interest, or whether the tool and the region of interest overlap each other in the observation image. The region-of-interest recognizing unit 222 and the tool information recognizing unit 224 may refer to the individual information of the endoscope 100 in the above recognition.

Determination of Biopsy State and so forth

The tool information recognizing unit 224 determines whether the state is the biopsy state or the biopsy preparation state, on the basis of the definition and the numerical values serving as determination criteria set in FIG. 7, and the tool information recognized in step S140 (step S150: a state determination step). If the state is the biopsy state or the biopsy preparation state (YES in step S150), the display control unit 226 sets the distinguishable display mode of the biopsy state in the case of the biopsy state and the distinguishable display mode of the biopsy preparation state in the case of the biopsy preparation state, in accordance with the mode set in FIG. 8 (step S160: a display control step). If the state is the non-biopsy state (NO in step S150), the display control unit 226 sets the distinguishable display mode of the non-biopsy state in accordance with the mode set in FIG. 8 (step S170: a display control step). If a region of interest has not been recognized, it is not necessary to perform distinguishable display.

Distinguishable Display of Observation Image

The display control unit 226 (a processor) causes the display device to distinguishably display an observation image in a manner in which a region of interest has distinguishability based on the recognition result of tool information (step S180: a display control step).

Figure 9:
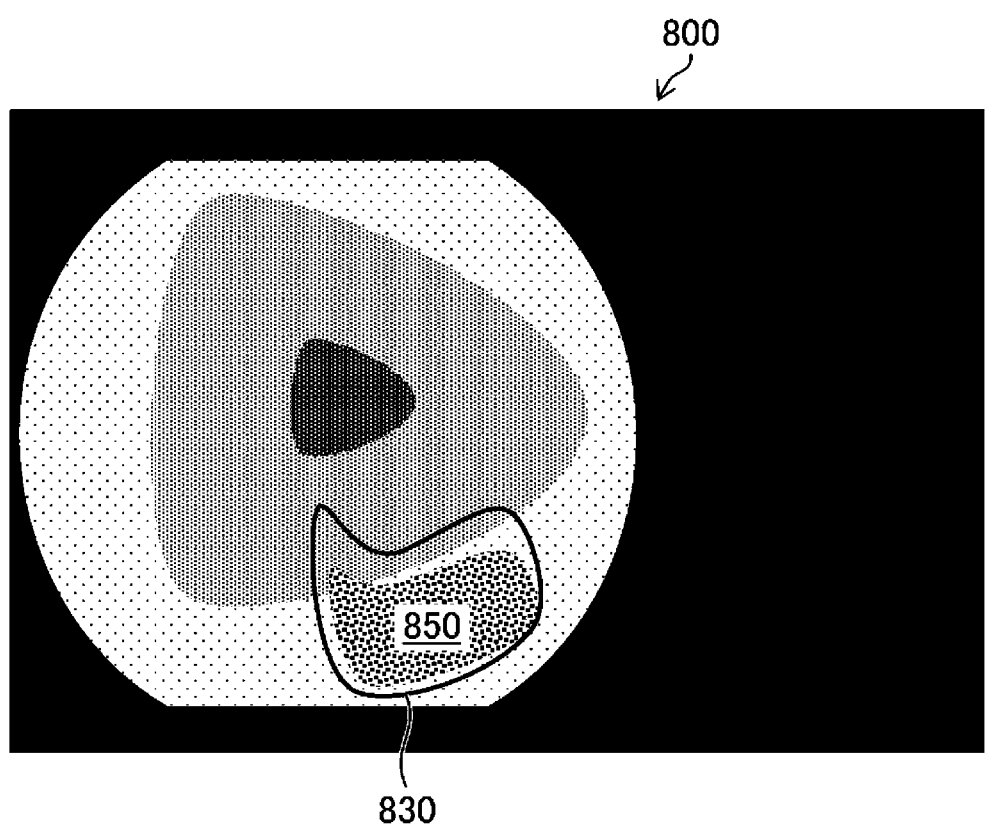
FIG. 9 is a diagram illustrating an example of distinguishable display of a biopsy target range (region of interest)

FIG. 9 illustrates an example of distinguishable display of a biopsy target range (a region of interest). In an observation image 800 illustrated in FIG. 9, a region 830 is a real region of interest (the boundary of the region 830 is displayed for convenience of description; the same applies hereinafter), and a region 850 is a region of interest recognized (detected) by the region-of-interest recognizing unit 222 (CNN 562). In the state illustrated in the FIG. 9, no tool has been inserted, which is the non-biopsy state (a non-use state, a non-operation state). In FIG. 9, the display control unit 226 displays the region 850 in a filled manner, and the distinguishability of the region of interest is high. However, as described above, continuation of such distinguishable display in the biopsy state or the biopsy preparation state would disturb the doctor. Accordingly, in the present embodiment, in the biopsy state and the biopsy preparation state, distinguishable display is performed with lower distinguishability for the region of interest than in the non-biopsy state, as exemplified below. These distinguishable display operations can be performed also in the case of treatment other than biopsy (ESD, EMR, or the like).

Display Example 1

Figure 10A:
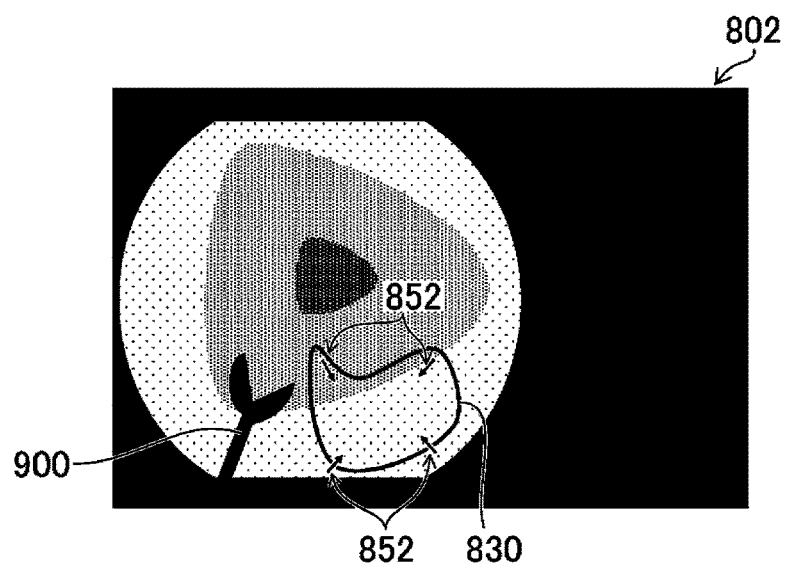
FIGS. 10A to 10C are diagrams each illustrating an example in which an observation image is displayed with decreased distinguishability of a region of interest.
Figure 10B:
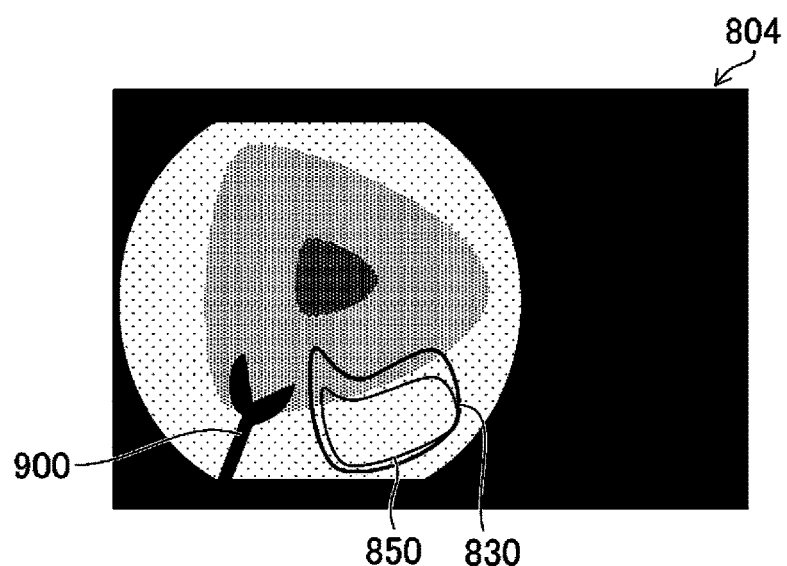
Figure 10C:
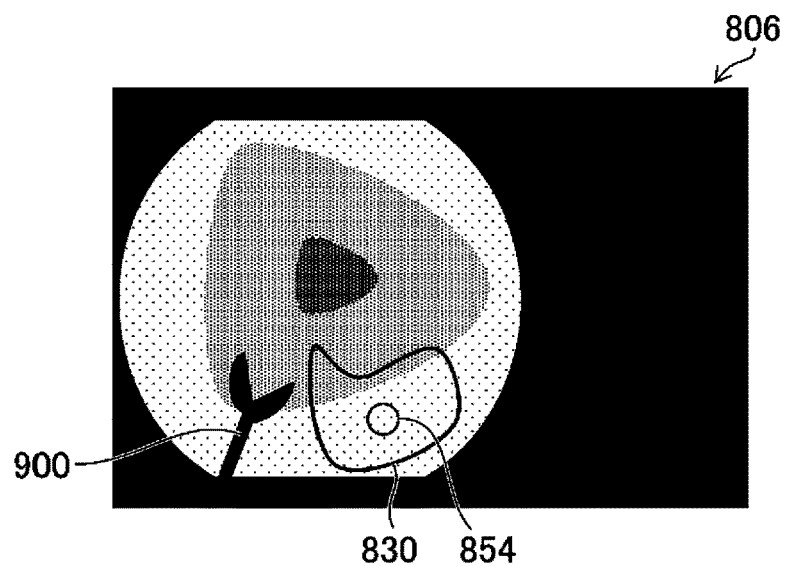

FIGS. 10A to 10C are diagrams each illustrating an example in which an observation image is displayed with decreased distinguishability of a region of interest (a biopsy preparation state in which forceps 900 as an example of a tool (a treatment tool) have been inserted). FIG. 10A illustrates an example in which arrows 852 (symbols) are displayed so as to be superimposed on part of the region of interest in an observed image 802. FIG. 10B illustrates an example in which the contour of a region 850 (a region of interest) is displayed in an observation image 804. FIG. 10C illustrates an example in which a circular figure 854 (a figure) is displayed so as to be superimposed on part of the region of interest in an observation image 806. The figure displayed so as to be superimposed has a medium size (see "partial display (medium)" in the region 770 in FIG. 8). The object that is displayed so as to be superimposed is not limited to the figures or symbols illustrated in these examples, and may be characters or numerals. In addition, the display control unit 226 may display a frame (a bounding box or the like) surrounding the region of interest in a superimposed manner on the observation image. In the biopsy state, the display control unit 226 is capable of making the distinguishability in superimposed display lower than in the biopsy preparation state, for example, by reducing the number of characters, numerals, or symbols to be displayed so as to be superimposed, or by changing a solid line to a dotted line. In the biopsy state, the display control unit 226 may make the distinguishability of the region of interest lower than in the biopsy preparation state, for example, by changing the color and/or brightness of the region of interest instead of decreasing the distinguishability in superimposed display.

Display Example 2

Figure 11A:
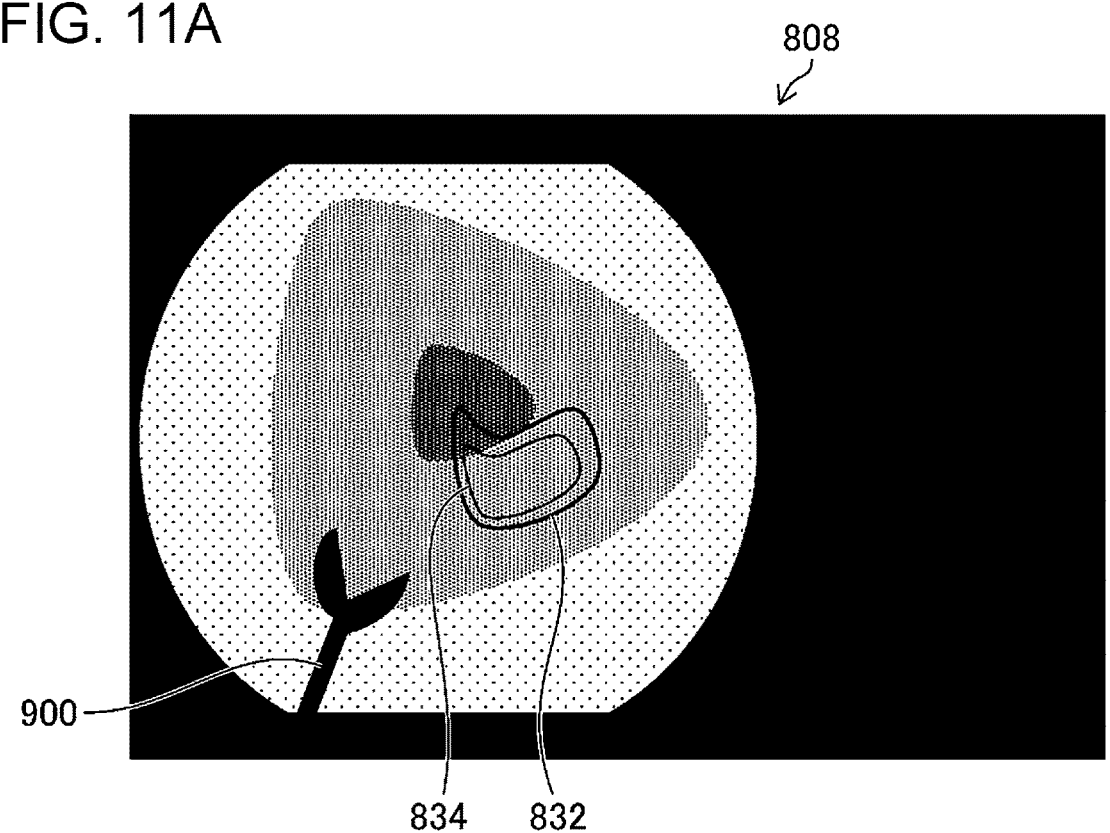
FIGS. 11A and 11B are diagrams each illustrating an example of distinguishable display based on the distance between a tool and a region of interest.
Figure 11B:
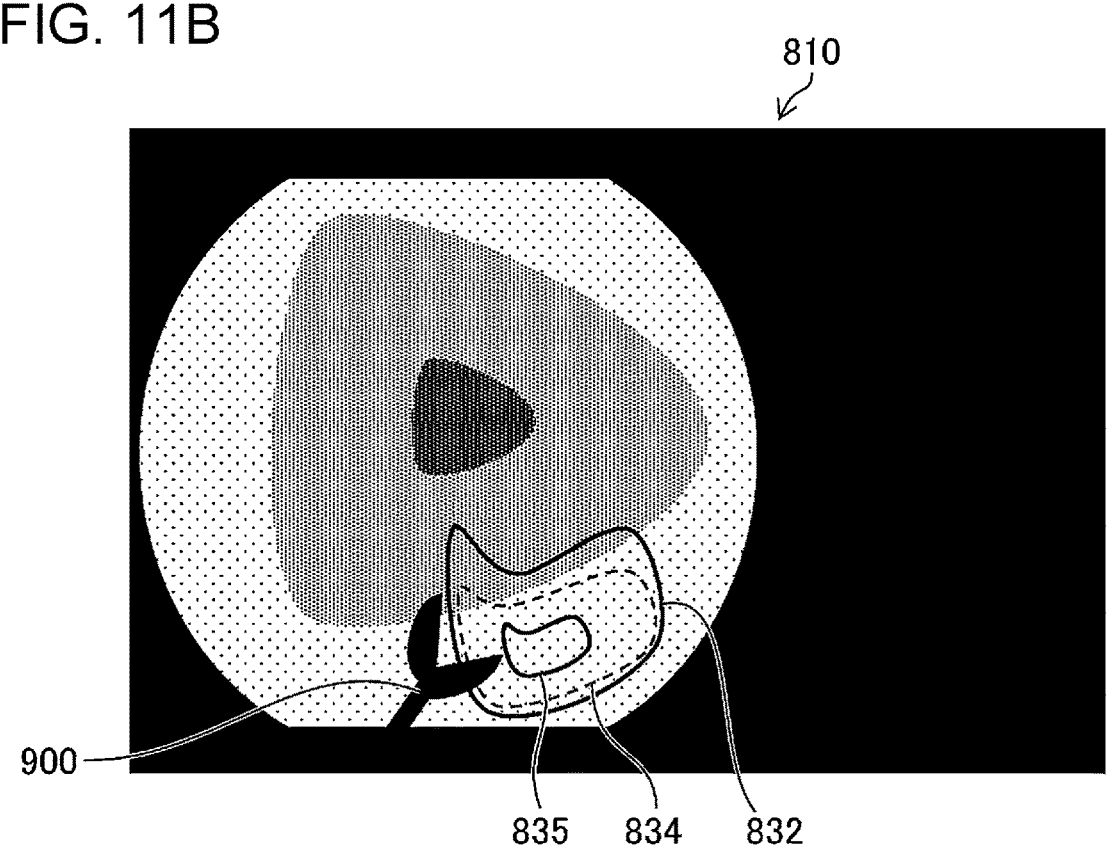

FIGS. 11A and 11B are diagrams each illustrating an example of distinguishable display based on the distance between a tool and a region of interest. In the state illustrated in FIG. 11A, the distance between the forceps 900 (a tool, a treatment tool) and a region of interest (a real region of interest 832, a region of interest 834 recognized by the region-of-interest recognizing unit 222) is long in an observation image 808, and thus the contour of the region of interest 834 is displayed. On the other hand, in the state illustrated in FIG. 11B, the distance between the forceps 900 and the region of interest is short in the observation image 810, and thus the region of interest is displayed at a reduced ratio by using a figure 835 (a figure) to decrease the distinguishability. In FIG. 11B, the contour of the region of interest 834 is indicated by a dotted line. The dotted line need not actually be displayed on the monitor 400 because it is a reference line for indicating that the region of interest is displayed at a reduced ratio.

Display Example 3

Figure 12A:
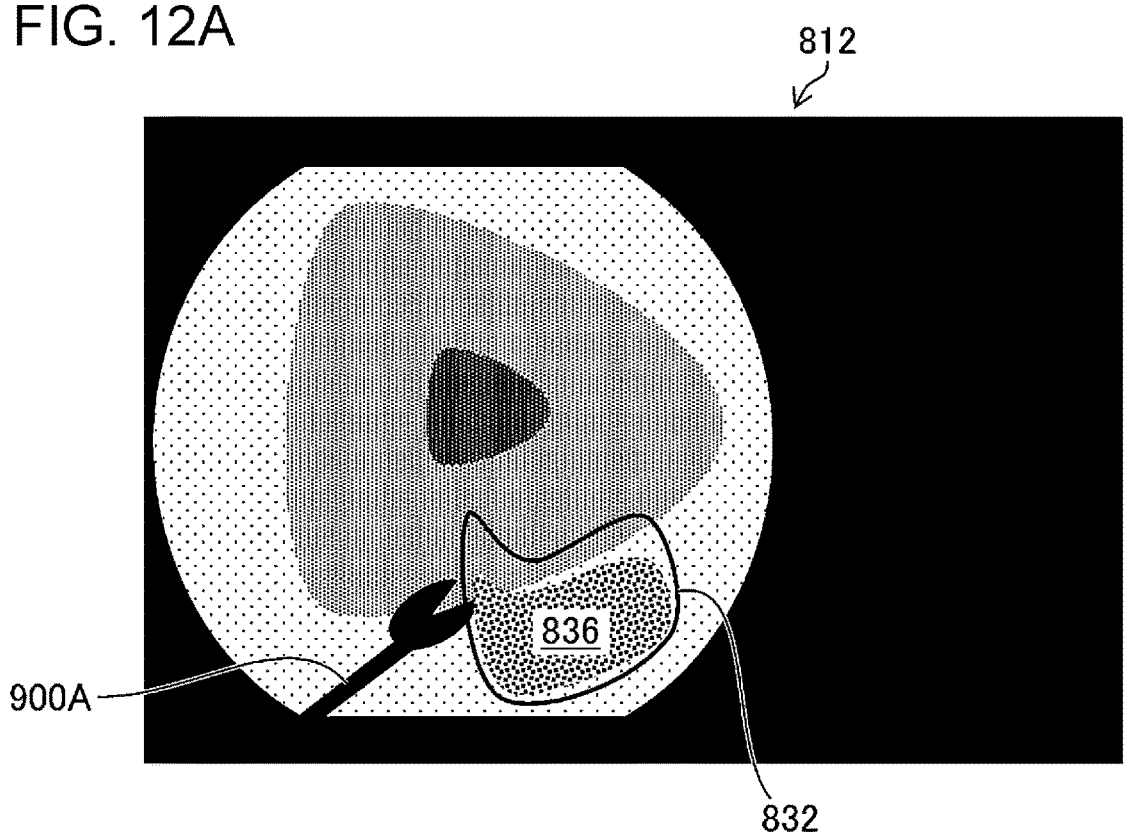
FIGS. 12A and 12B are diagrams each illustrating an example of distinguishable display based on the operation state of a tool.
Figure 12B:
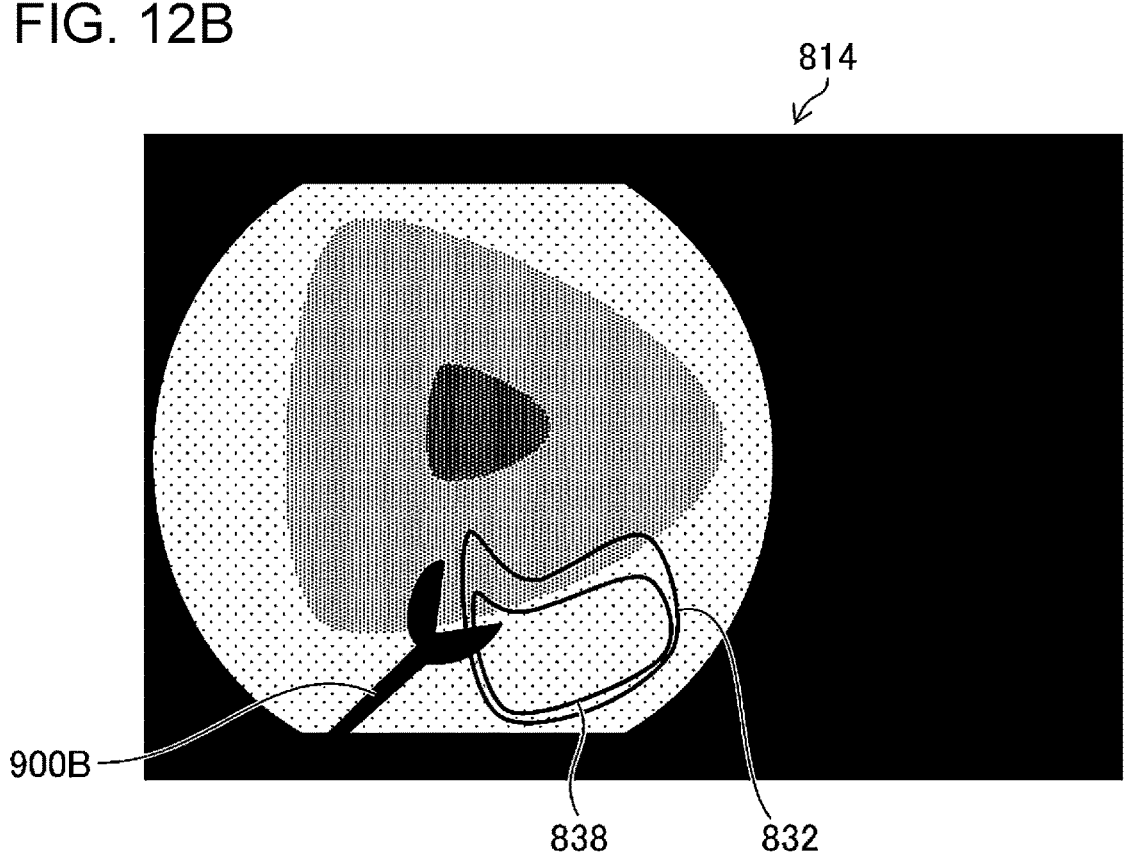

FIGS. 12A and 12B are diagrams each illustrating an example of distinguishable display based on the operation state of a tool. In the state illustrated in FIG. 12A, forceps 900A have been inserted but the blades are closed (a non-operation state) in an observation image 812. Thus, the tool information recognizing unit 224 is capable of determining that "the state is the biopsy preparation state". Accordingly, the display control unit 226 displays a region of interest 836 (a region of interest recognized by the region-of-interest recognizing unit 222; the real region of interest is the region of interest 832) in a filled manner to increase the distinguishability. In contrast, in the state illustrated in FIG. 12B, the blades of forceps 900B are open (an operation state) in an observation image 814. Thus, the tool information recognizing unit 224 is capable of determining that "the state is the biopsy state", and accordingly, the display control unit 226 displays the contour of a region of interest 838 to decrease the distinguishability.

Display Example 4

Figure 13A:
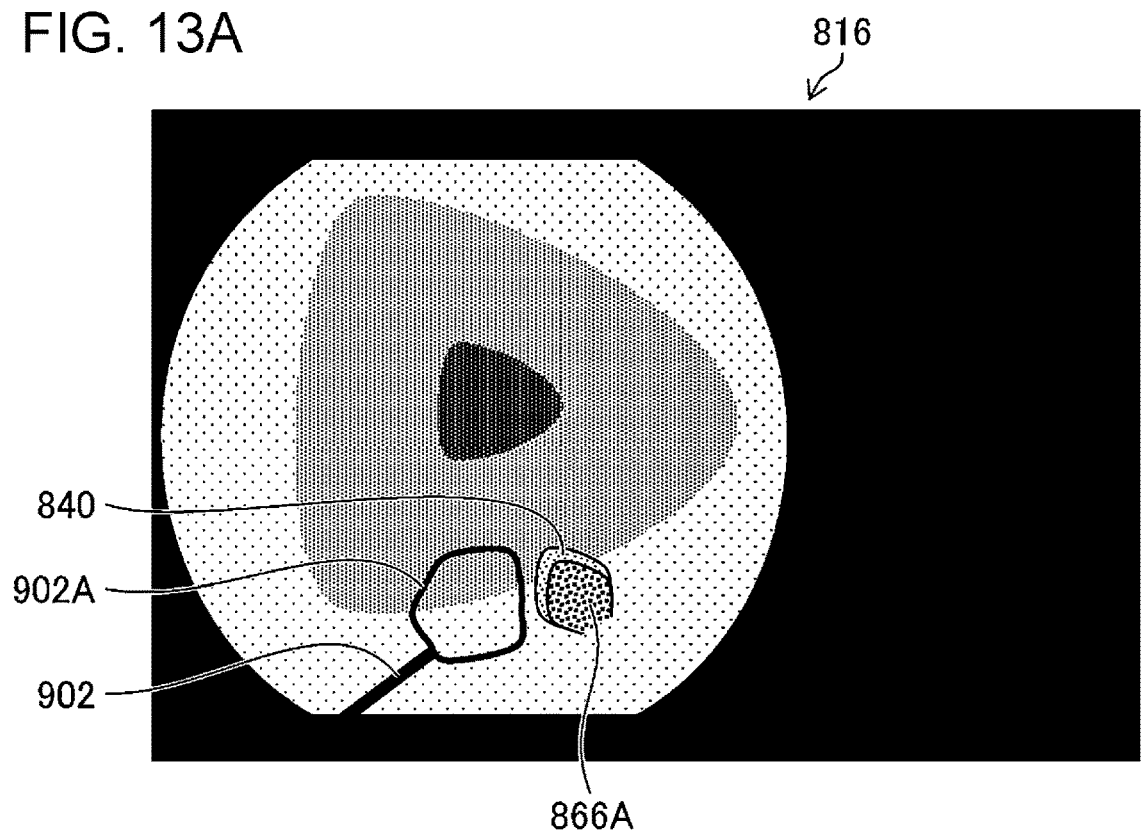
FIGS. 13A and 13B are diagrams each illustrating another example of distinguishable display based on the operation state of a tool.
Figure 13B:
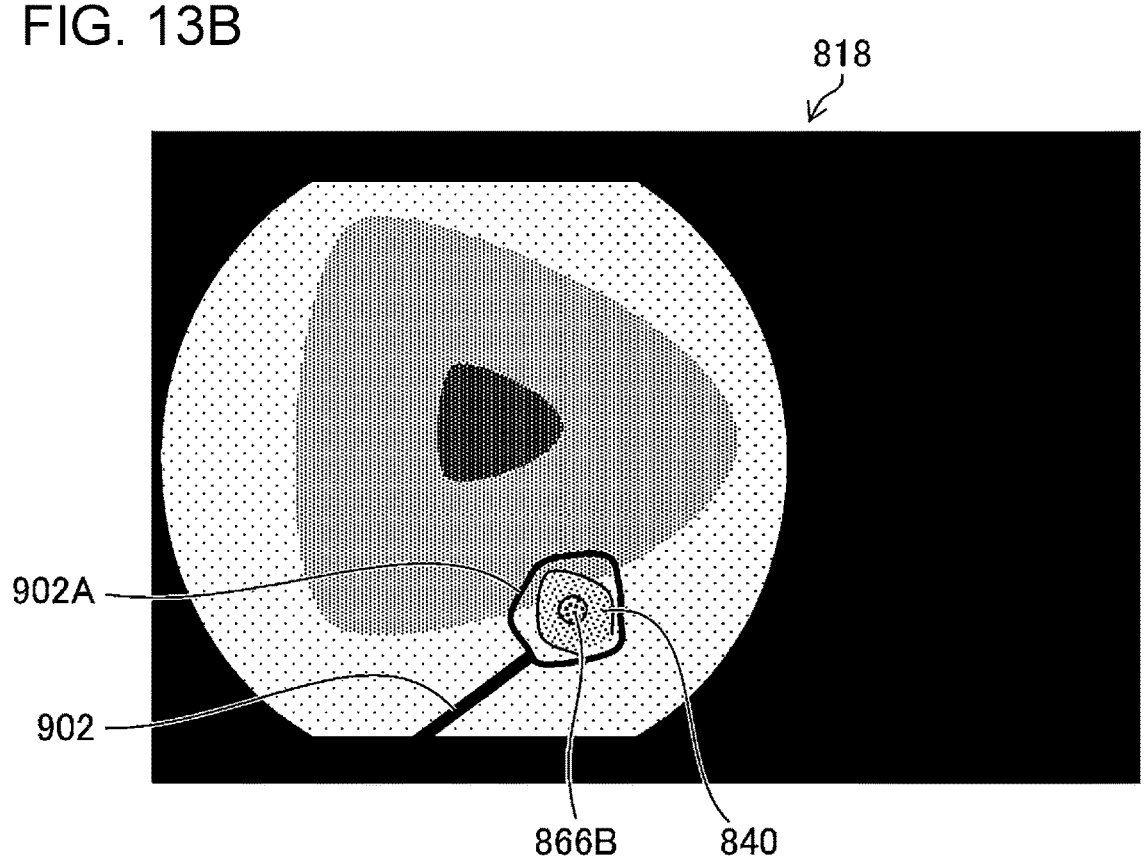

FIGS. 13A and 13B are diagrams each illustrating another example of distinguishable display based on the operation state of a tool. In the state illustrated in FIG. 13A, a snare 902 (a tool, a treatment tool) has been inserted in an observation image 816, but a region of interest 840 (a lesion) is not caught in a ring 902A of the wire. Thus, the tool information recognizing unit 224 is capable of determining that "the state is the biopsy preparation state". Accordingly, the display control unit 226 displays a figure 866A (a figure) in a superimposed manner on the region of interest 840 to increase the distinguishability. In contrast, in the state illustrated in FIG. 13B, the region of interest starts to be caught in the ring 902A in an observation image 818. Thus, the tool information recognizing unit 224 is capable of determining that "the state is the biopsy state". Accordingly, the display control unit 226 displays a small circular figure 866B (a figure) in a superimposed manner on the region of interest 840, thereby making the distinguishability lower than in the state illustrated in FIG. 13A.

In the state illustrated in FIG. 13B, the tool information recognizing unit 224 may determine that "the tool overlaps the region of interest (the distance is shorter than or equal to the threshold value)".

Display Example 5

Figure 14A:
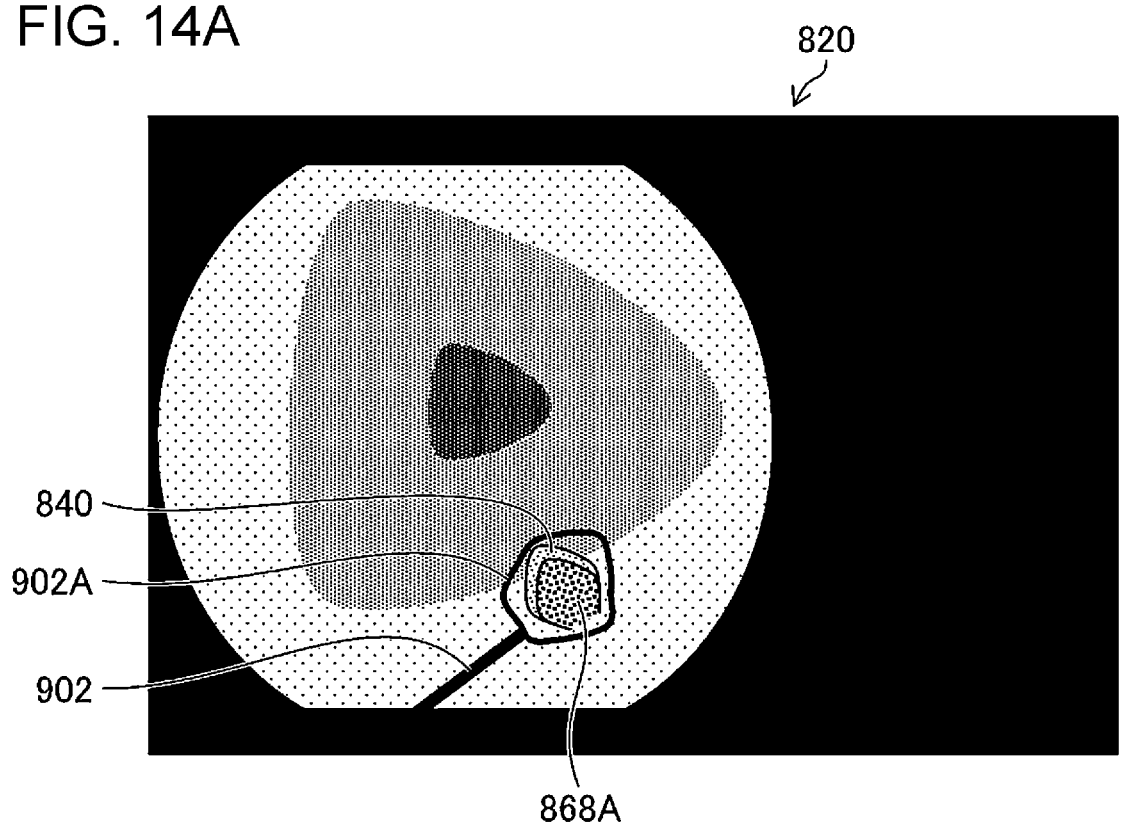
FIGS. 14A and 14B are diagrams each illustrating still another example of distinguishable display based on the operation state of a tool.
Figure 14B:
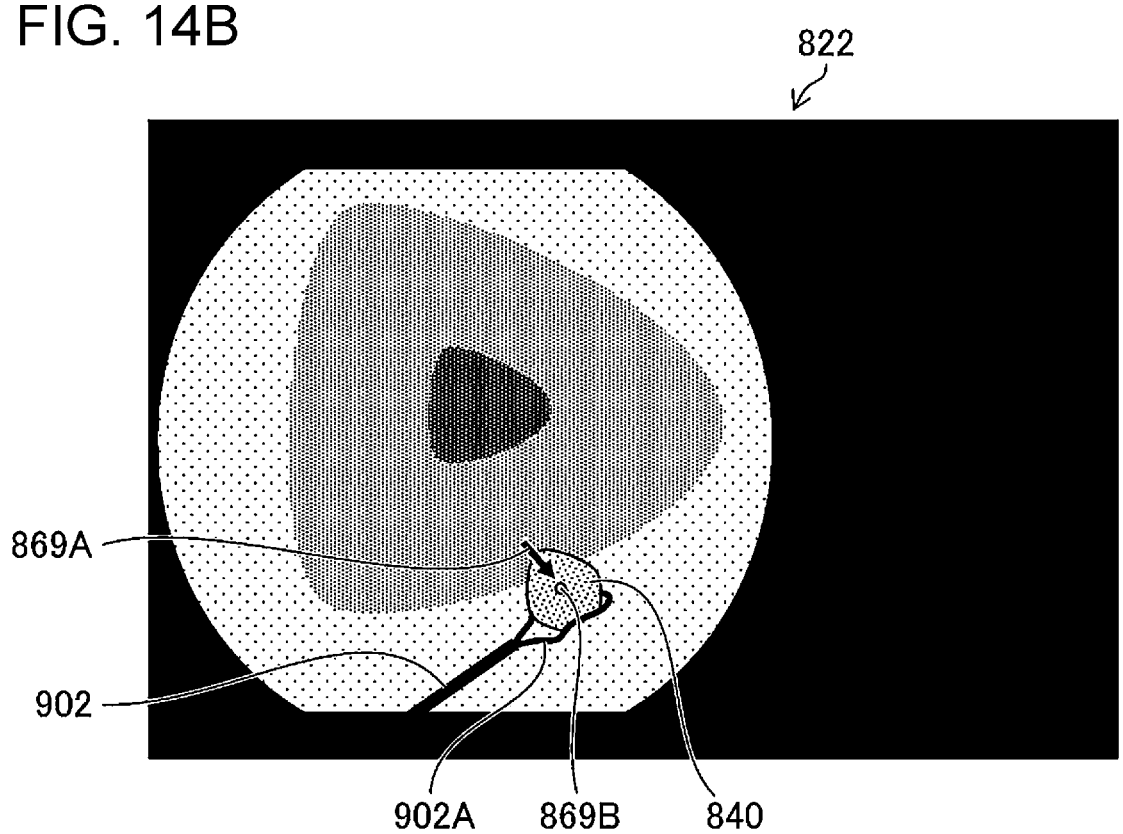

FIGS. 14A and 14B are diagrams each illustrating still another example of distinguishable display based on the operation state of a tool. In the state illustrated in FIG. 14A, the snare 902 (a tool, a treatment tool) has been inserted and the region of interest 840 (a lesion) is caught in the ring 902A of the wire in an observation image 820, but the ring 902A is open. Thus, the tool information recognizing unit 224 is capable of determining that "the state is the biopsy preparation state". Accordingly, the display control unit 226 displays a figure 868A (a figure) in a superimposed manner on the region of interest 840 to increase the distinguishability. In contrast, in the state illustrated in FIG. 14B, the ring 902A starts to be closed in an observation image 822. Thus, the tool information recognizing unit 224 is capable of determining that "the state is the biopsy state". Accordingly, the display control unit 226 displays an arrow 869A (a symbol) and a point 869B (a figure, a symbol) in a superimposed manner on the region of interest 840, thereby making the distinguishability lower than in the state illustrated in FIG. 14A.

Display Example 6

Figure 15A:
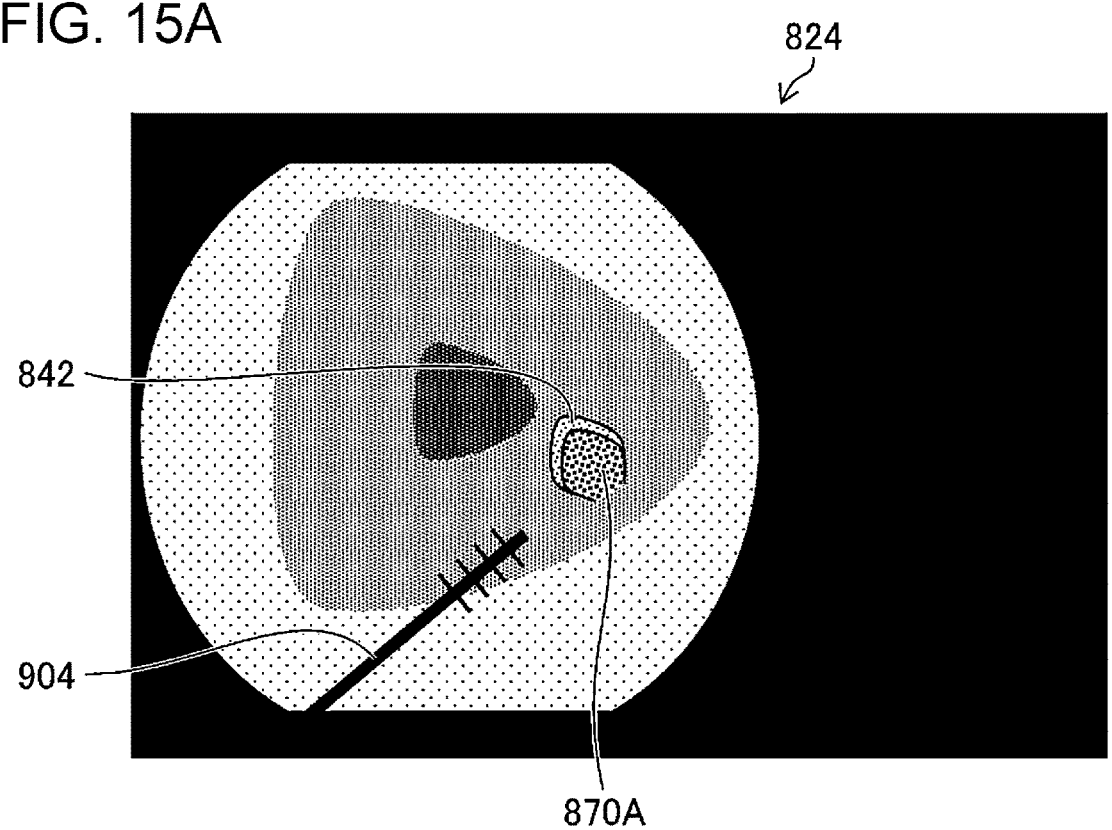
FIGS. 15A and 15B are diagrams each illustrating still another example of distinguishable display based on the operation state of a tool.
Figure 15B:
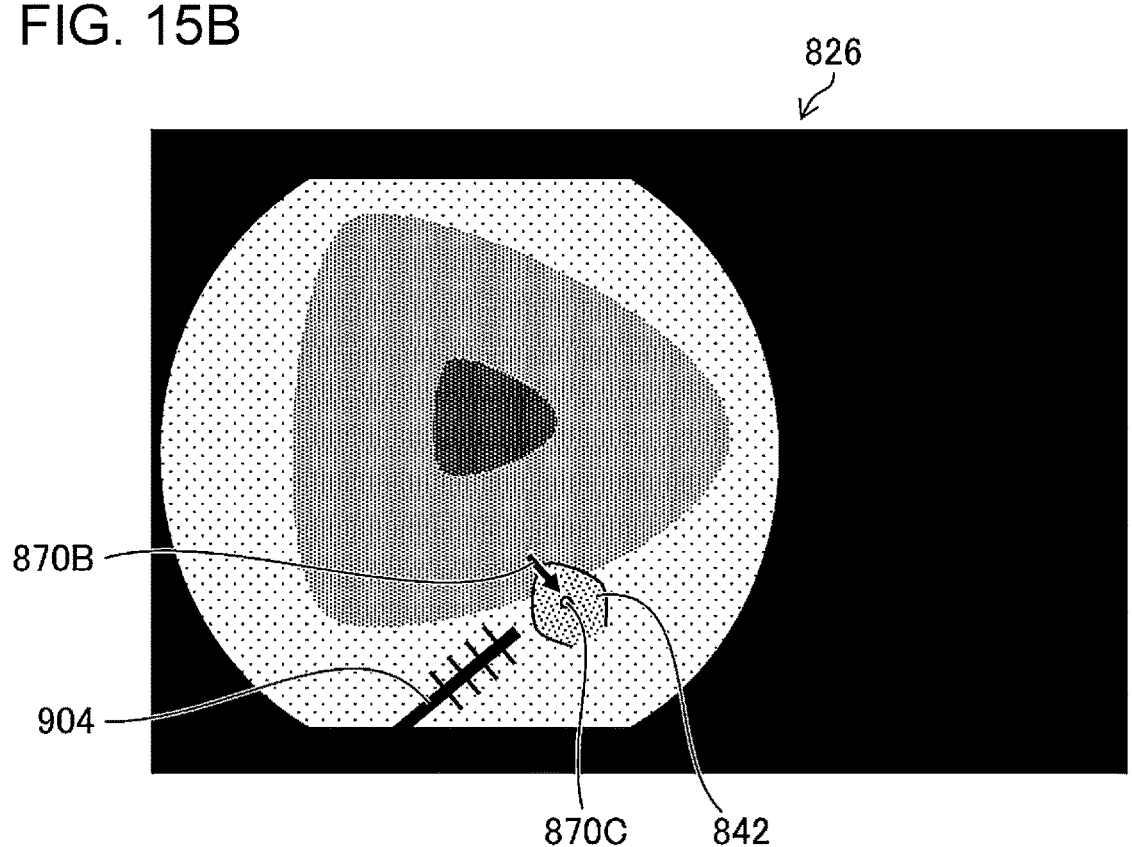

FIGS. 15A and 15B are diagrams each illustrating still another example of distinguishable display based on the operation state of a tool. In the state illustrated in FIG. 15A, a brush 904 (a tool) is far from a region of interest 842 in an observation image 824. Thus, the tool information recognizing unit 224 is capable of determining that "the state is the biopsy preparation state", and the display control unit 226 displays a figure 870A (a figure) in a superimposed manner on the region of interest 842 to increase the distinguishability. In contrast, in the state illustrated in FIG. 15B, the brush 904 is close to the region of interest 842 in an observation image 826. Thus, the tool information recognizing unit 224 is capable of determining that "the state is the biopsy state". The display control unit 226 displays an arrow 870B (a symbol) and a point 870C (a figure, a symbol) in a superimposed manner on the region of interest 842, thereby making the distinguishability lower than in the state illustrated in FIG. 15A.

In the above-described display examples, the display control unit 226 may decrease the distinguishability in the biopsy state and the biopsy preparation state by changing the color and/or brightness of the fill, contour, symbol, or the like as compared with the non-biopsy state.

The CPU 210 and the image processing unit 204 repeat the process of steps S120 to S180 until observation ends (during NO in step S190).

As described above, according to the medical image processing apparatus, the endoscope system, the medical image processing method, and the medical image processing program according to the first embodiment, a user is able to set the definition of a biopsy state and so forth and the mode of distinguishable display as necessary, the tool information recognizing unit 224 recognizes tool information, and the display control unit 226 performs distinguishable display of an observation image on the basis of the recognition result. Accordingly, a region of interest can be displayed with appropriate distinguishability.

Appendices

In addition to the above-described aspects, the configurations described below are included in the scope of the present invention.

Appendix 1

A medical image processing apparatus wherein
a medical image analysis processing unit detects a region of interest on the basis of a feature quantity of pixels of a medical image, the region of interest being a region to be focused on, and
a medical image analysis result acquiring unit acquires an analysis result of the medical image analysis processing unit.

Appendix 2

A medical image processing apparatus wherein
a medical image analysis processing unit detects presence or absence of a target to be focused on, on the basis of a feature quantity of pixels of a medical image, and
a medical image analysis result acquiring unit acquires an analysis result of the medical image analysis processing unit.

Appendix 3

The medical image processing apparatus wherein
the medical image analysis result acquiring unit
acquires the analysis result of the medical image from a recording device in which the analysis result is recorded, and
the analysis result is either or both of the region of interest which is a region to be focused on included in the medical image and the presence or absence of the target to be focused on.

Appendix 4

The medical image processing apparatus wherein the medical image is a normal-light image acquired by radiating light in a white range or light in a plurality of wavelength ranges as the light in the white range.

Appendix 5

The medical image processing apparatus wherein
the medical image is an image acquired by radiating light in a specific wavelength range, and
the specific wavelength range is a range narrower than a white wavelength range.

Appendix 6

The medical image processing apparatus wherein the specific wavelength range is a blue or green range in a visible range.

Appendix 7

The medical image processing apparatus wherein the specific wavelength range includes a wavelength range of 390 nm or more and 450 nm or less or a wavelength range of 530 nm or more and 550 nm or less, and the light in the specific wavelength range has a peak wavelength in the wavelength range of 390 nm or more and 450 nm or less or the wavelength range of 530 nm or more and 550 nm or less.

Appendix 8

The medical image processing apparatus wherein the specific wavelength range is a red range in a visible range.

Appendix 9

The medical image processing apparatus wherein the specific wavelength range includes a wavelength range of 585 nm or more and 615 nm or less or a wavelength range of 610 nm or more and 730 nm or less, and the light in the specific wavelength range has a peak wavelength in the wavelength range of 585 nm or more and 615 nm or less or the wavelength range of 610 nm or more and 730 nm or less.

Appendix 10

The medical image processing apparatus wherein the specific wavelength range includes a wavelength range in which a light absorption coefficient is different between oxyhemoglobin and deoxyhemoglobin, and the light in the specific wavelength range has a peak wavelength in the wavelength range in which the light absorption coefficient is different between oxyhemoglobin and deoxyhemoglobin.

Appendix 11

The medical image processing apparatus wherein the specific wavelength range includes a wavelength range of 400±10 nm, a wavelength range of 440±10 nm, a wavelength range of 470±10 nm, or a wavelength range of 600 nm or more and 750 nm or less, and the light in the specific wavelength range has a peak wavelength in the wavelength range of 400±10 nm, the wavelength range of 440±10 nm, the wavelength range of 470±10 nm, or the wavelength range of 600 nm or more and 750 nm or less.

Appendix 12

The medical image processing apparatus wherein
the medical image is an inside-of-living-body image depicting an inside of a living body, and
the inside-of-living-body image has information about fluorescence emitted by a fluorescent substance in the living body.

Appendix 13

The medical image processing apparatus wherein the fluorescence is acquired by irradiating the inside of the living body with excitation light whose peak is 390 nm or more and 470 nm or less.

Appendix 14

The medical image processing apparatus wherein
the medical image is an inside-of-living-body image depicting an inside of a living body, and
the specific wavelength range is a wavelength range of infrared light.

Appendix 15

The medical image processing apparatus wherein the specific wavelength range includes a wavelength range of 790 nm or more and 820 nm or less or a wavelength range of 905 nm or more and 970 nm or less, and the light in the specific wavelength range has a peak wavelength in the wavelength range of 790 nm or more and 820 nm or less or the wavelength range of 905 nm or more and 970 nm or less.

Appendix 16

The medical image processing apparatus wherein
a medical image acquiring unit includes a special-light image acquiring unit that acquires a special-light image having information about the specific wavelength range on the basis of a normal-light image that is acquired by radiating light in a white range or light in a plurality of wavelength ranges as the light in the white range, and
the medical image is the special-light image.

Appendix 17

The medical image processing apparatus wherein a signal in the specific wavelength range is acquired through computation based on color information of RGB or CMY included in the normal-light image.

Appendix 18

The medical image processing apparatus including
a feature quantity image generating unit that generates a feature quantity image through computation based on at least one of a normal-light image or a special-light image, the normal-light image being acquired by radiating light in a white range or light in a plurality of wavelength ranges as the light in the white range, the special-light image being acquired by radiating light in a specific wavelength range, wherein
the medical image is the feature quantity image.
Appendix 19
An endoscope apparatus including:
the medical image processing apparatus according to any one of appendices 1 to 18; and
an endoscope that acquires an image by radiating at least any one of light in a white wavelength range or light in a specific wavelength range.

Appendix 20

A diagnosis assistance apparatus including the medical image processing apparatus according to any one of appendices 1 to 18.

Appendix 21

A medical work assistance apparatus including the medical image processing apparatus according to any one of appendices 1 to 18.

The embodiment of the present invention and other examples have been described above. The present invention is not limited to the above-described aspects, and various modifications can be made without deviating from the spirit of the present invention.

REFERENCE SIGNS LIST 10 endoscope system
100 endoscope
102 handheld operation section
104 insertion section
106 universal cable
108 light guide connector
112 soft part
114 bending part
116 tip rigid part
116A distal-end-side surface
123 illumination unit
123A illumination lens
123B illumination lens
126 forceps port
130 imaging optical system
132 imaging lens
134 imaging element
136 driving circuit
138 AFE
139 scope information recording unit
141 air/water supply button
142 suction button
143 function button
144 imaging button
170 light guide
200 medical image processing apparatus
202 image input controller
204 image processing unit
205 communication control unit
206 video output unit
207 recording unit
208 operation unit
209 audio processing unit
209A speaker
210 CPU
211 ROM
212 RAM
220 medical image acquiring unit
222 region-of-interest recognizing unit
224 tool information recognizing unit
226 display control unit
228 recording control unit
230 scope information acquiring unit
300 light source apparatus
310 light source
310B blue light source
310G green light source
310R red light source
310V violet light source
330 diaphragm
340 condenser lens
350 light source control unit
400 monitor
562A input layer
562B intermediate layer
562C output layer
564 convolutional layer
565 pooling layer
566 fully connected layer
700 screen
702 region
703A radio button
703B region
710 region
720 region
750 screen
760 region
760A radio button
760B radio button 760C radio button
760D radio button
770 region
780 region
800 observation image
802 observation image
804 observation image
806 observation image
808 observation image
812 observation image
814 observation image
816 observation image
818 observation image
822 observation image
826 observation image
830 region
832 region of interest
834 region of interest
835 figure
836 region of interest
838 region of interest
840 region of interest
842 region of interest
850 region
852 arrow
854 figure
866A figure
866B figure
868A figure
869A arrow
869B point
870A figure
870B arrow
870C point
900 forceps
900A forceps
900B forceps
902 snare
902A ring
904 brush
$F_1$ filter
$F_2$ filter
S100-S190 individual steps of medical image processing method

What is claimed is:

1. A medical image processing apparatus comprising a processor,
    the processor being configured to perform:
    an image acquisition process of acquiring an observation image of a subject;
    a region-of-interest recognition process of recognizing a region of interest from the observation image;
    a tool information recognition process of recognizing tool information from the observation image, the tool information being information on a tool used for treatment of the subject; and
    a display control process of causing a display device to distinguishably display the observation image in a manner in which the region of interest has distinguishability based on a recognition result of the tool information,
    wherein in the tool information recognition process, the processor determines a state of treatment by the tool based on the tool information, and
    performs the display control process based on the state of treatment by the tool, and
    wherein the processor is configured to
    in the tool information recognition process, determine which of an in-treatment state, a pre-treatment state, and a non-treatment state the state of treatment by the tool is on the basis of the tool information, the in-treatment state being a state in which treatment is being performed on the region of interest with the tool, the pre-treatment state being a state in which preparation for the treatment is being performed, and the non-treatment state being a state other than the in-treatment state and the pre-treatment state, and
    in the display control process, in the in-treatment state and the pre-treatment state, cause the observation image to be displayed with the distinguishability being lower than in the non-treatment state.

2. The medical image processing apparatus according to claim 1, wherein the processor is configured to
    in the display control process, in the in-treatment state, cause the observation image to be displayed with the distinguishability being lower than in the pre-treatment state.

3. The medical image processing apparatus according to claim 1, wherein the processor is configured to
    in the tool information recognition process, determine which of the in-treatment state, the pre-treatment state, and the non-treatment state the state of treatment by the tool is on the basis of the tool information including at least one of whether the tool has been inserted, a type of the tool inserted, a length of the insertion, an operation state of the tool, a distance between the tool and the region of interest, or whether the tool and the region of interest overlap each other in the observation image.

4. The medical image processing apparatus according to claim 1, wherein the processor is configured to
    in the display control process, in the in-treatment state and/or the pre-treatment state, cause a frame surrounding the region of interest to be displayed so as to be superimposed on the observation image.

5. The medical image processing apparatus according to claim 4, wherein the processor is configured to
    in the in-treatment state and the pre-treatment state, make distinguishability in the superimposed display lower than in the non-treatment state.

6. The medical image processing apparatus according to claim 1, wherein the processor is configured to
    in the display control process, in the in-treatment state and the pre-treatment state, cause a symbol indicating the region of interest to be displayed so as to be superimposed on the observation image.

7. The medical image processing apparatus according to claim 1, wherein the processor is configured to
    in the display control process, in the in-treatment state and the pre-treatment state, cause at least one of a character, a figure, or a symbol to be displayed so as to be superimposed on part of the region of interest in the observation image.

8. The medical image processing apparatus according to claim 1, wherein the processor is configured to
    in the display control process, in the in-treatment state and the pre-treatment state, cause the observation image to be displayed with the region of interest having a color and/or a brightness different from a color and/or a brightness of the region of interest in the non-treatment state.

9. An endoscope system comprising:
    a medical image processing apparatus comprising a processor, the processor being configured to perform:
- an image acquisition process of acquiring an observation image of a subject;
- a region-of-interest recognition process of recognizing a region of interest from the observation image;
- a tool information recognition process of recognizing tool information from the observation image, the tool information being information on a tool used for treatment of the subject; and
- a display control process of causing a display device to distinguishably display the observation image in a manner in which the region of interest has distinguishability based on a recognition result of the tool information;

the display device configured to display the observation image; and an endoscope that is to be inserted into the subject and that has an imaging unit comprising an imaging lens and an imaging element, wherein the imaging unit is configured to capture the observation image, wherein in the tool information recognition process, the processor determines a state of treatment by the tool based on the tool information, and performs the display control process based on the state of treatment by the tool, and wherein the processor is configured to in the tool information recognition process, determine which of an in-treatment state, a pre-treatment state, and a non-treatment state the state of treatment by the tool is on the basis of the tool information, the in-treatment state being a state in which treatment is being performed on the region of interest with the tool, the pre-treatment state being a state in which preparation for the treatment is being performed, and the non-treatment state being a state other than the in-treatment state and the pre-treatment state, and in the display control process, in the in-treatment state and the pre-treatment state, cause the observation image to be displayed with the distinguishability being lower than in the non-treatment state.

10. A medical image processing method for causing a computer to execute:
- an image acquisition step of acquiring an observation image of a subject;
- a region-of-interest recognition step of recognizing a region of interest from the observation image;
- a tool information recognition step of recognizing tool information from the observation image, the tool information being information on a tool used for treatment of the subject; and
- a display control step of causing a display device to distinguishably display the observation image in a manner in which the region of interest has distinguishability based on a recognition result of the tool information, wherein in the tool information recognition step, the computer determines a state of treatment by the tool based on the tool information, and executes the display control step based on the state of treatment by the tool, and wherein in the tool information recognition step, a determination is made as to which of an in-treatment state, a pre-treatment state, and a non-treatment state the state of treatment by the tool is on the basis of the tool information, the in-treatment state being a state in which treatment is being performed on the region of interest with the tool, the pre-treatment state being a state in which preparation for the treatment is being performed, and the non-treatment state being a state other than the in-treatment state and the pre-treatment state, and in the display control step, in the in-treatment state and the pre-treatment state, the display device is caused to display the observation image with the distinguishability being lower than in the non-treatment state.

11. The medical image processing method according to claim 10, wherein in the display control step, in the in-treatment state, the observation image is caused to be displayed with the distinguishability being lower than in the pre-treatment state.

12. The medical image processing method according to claim 10, wherein in the tool information recognition step, a determination is made as to which of the in-treatment state, the pre-treatment state, and the non-treatment state the state of treatment by the tool is on the basis of the tool information including at least one of whether the tool has been inserted, a type of the tool inserted, a length of the insertion, an operation state of the tool, a distance between the tool and the region of interest, or whether the tool and the region of interest overlap each other in the observation image.

13. A non-transitory, computer-readable tangible recording medium which records thereon a program for causing, when read by a computer, the computer to execute the medical image processing method according to claim 10.

* * * * *